United States Patent
Zhou et al.

(10) Patent No.: US 10,505,483 B2
(45) Date of Patent: Dec. 10, 2019

(54) FAULT-TOLERANT PERMANENT-MAGNET VERNIER CYLINDRICAL ELECTRIC MOTOR WITH ELECTROMAGNETIC SUSPENSION AND FAULT-TOLERANT VECTOR CONTROL METHOD FOR SHORT CIRCUIT OF TWO ADJACENT PHASES

(71) Applicant: JIANGSU UNIVERSITY, Jiangsu (CN)

(72) Inventors: Huawei Zhou, Jiangsu (CN); Zhen Lu, Jiangsu (CN); Guohai Liu, Jiangsu (CN); Wenxiang Zhao, Jiangsu (CN); Jinghua Ji, Jiangsu (CN); Long Chen, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 0 days.

(21) Appl. No.: 16/257,178

(22) Filed: Jan. 25, 2019

(65) Prior Publication Data

US 2019/0229666 A1    Jul. 25, 2019

Related U.S. Application Data

(63) Continuation of application No. PCT/CN2016/095626, filed on Aug. 17, 2016.

(30) Foreign Application Priority Data

Jul. 26, 2016  (CN) ........................... 2016 1 0590925
Jul. 26, 2016  (CN) ........................... 2016 1 0591196

(51) Int. Cl.
*H02P 21/22*      (2016.01)
*H02K 1/17*       (2006.01)
(Continued)

(52) U.S. Cl.
CPC .......... *H02P 21/22* (2016.02); *B60G 17/0157* (2013.01); *H02K 1/165* (2013.01);
(Continued)

(58) Field of Classification Search
CPC ........ H02K 1/2766; H02K 1/16; H02K 1/165; H02K 21/44; H02K 1/17; H02P 2207/05;
(Continued)

(56) References Cited

U.S. PATENT DOCUMENTS 7,034,427 B2 *   4/2006   Hirzel ..................... H02K 7/12
                                                     310/156.35
7,872,440 B2 *   1/2011   Atarashi ............... B60L 15/025
                                                     318/772
(Continued)

FOREIGN PATENT DOCUMENTS

CN    101404435 A    4/2009
CN    101795048 A    8/2010
(Continued)

OTHER PUBLICATIONS

International Search Report corresponding to International Patent Application No. PCT/CN2016/095626 dated Mar. 31, 2017.

*Primary Examiner* — Thai T Dinh
(74) *Attorney, Agent, or Firm* — Jenkins, Wilson, Taylor & Hunt, P.A.

(57) ABSTRACT

Disclosed are fault-tolerant permanent-magnet vernier cylindrical electric motors with an electromagnetic suspension and a fault-tolerant vector control method for a short circuit of two adjacent phases. The fault-tolerant permanent-magnet vernier cylindrical electric motor with an electromagnetic suspension and the fault-tolerant vector control method for a short circuit of two adjacent phases suppress motor thrust ripples caused by a fault of two adjacent phases of an electric motor. The dynamic performance and the
(Continued)

steady-state performance thereof are consistent with those under a normal state, and the switching frequency of a voltage source inverter is constant.

9 Claims, 10 Drawing Sheets

(51) Int. Cl.
*B60G 17/015* (2006.01)
*H02K 1/16* (2006.01)
*H02P 21/05* (2006.01)
*H02P 27/08* (2006.01)

(52) U.S. Cl.
CPC ............... *H02K 1/17* (2013.01); *H02P 21/05* (2013.01); *H02P 27/085* (2013.01)

(58) Field of Classification Search
CPC ........ H02P 21/22; H02P 21/05; H02P 27/085; B60G 17/0157
See application file for complete search history.

(56) References Cited

U.S. PATENT DOCUMENTS

| | | | | |
|---|---|---|---|---|
| 7,898,200 | B2* | 3/2011 | Atarashi | H02P 21/0003 |
| | | | | 318/432 |
| 8,294,318 | B2* | 10/2012 | Bando | H02K 16/02 |
| | | | | 310/112 |
| 8,294,322 | B2* | 10/2012 | Aiki | H02K 16/04 |
| | | | | 310/184 |
| 2015/0204401 | A1 | 7/2015 | Sakai et al. | |

FOREIGN PATENT DOCUMENTS

| | | |
|---|---|---|
| CN | 101882819 A | 11/2010 |
| CN | 102916642 A | 2/2013 |
| CN | 104578635 A | 4/2015 |
| CN | 104682807 A | 6/2015 |
| CN | 105245156 A | 1/2016 |
| JP | 2015135159 A | 7/2015 |

\* cited by examiner

FAULT-TOLERANT PERMANENT-MAGNET VERNIER CYLINDRICAL ELECTRIC MOTOR WITH ELECTROMAGNETIC SUSPENSION AND FAULT-TOLERANT VECTOR CONTROL METHOD FOR SHORT CIRCUIT OF TWO ADJACENT PHASES

TECHNICAL FIELD

The invention is about a five-phase permanent-magnet (PM) Vernier motor and its fault-tolerant control (FTC) method under adjacent double-phase faults, especially a five-phase tubular vernier PM (TVPM) motor for electromagnetic suspension and its fault-tolerant field-oriented control (FT-FOC) method under adjacent double-phase short-circuit faults. It is suitable for aerospace, electric vehicles, deep sea, medical equipment and so on, where have high requirements on reliability and dynamic performance.

BACKGROUND TECHNOLOGY

With the development of the society and the improvement of the living standard, people are taking more requirements on the comfort, safety and stability of vehicle riding. As an important part of modern car, the performance of suspension system has great influence on riding comfort and operating stability. Hence, the researches on active suspension system are drawn much more attention. As the core component of the active suspension system, the researches on tubular motor have been paid more attention.

Domestic and foreign scholars have proposed many different tubular motor topologies, which are suitable for different fields. Tubular motor can be divided into different types with different classification standards. It can be divided into long-stator and long-mover tubular motor according to the different length between the stator and the mover. It can be divided into the primary PM and secondary PM tubular motor according to the different position of PMs. Also, It can be divided into single-stator and dual-stator tubular motor according to the different number of stator. The Chinese Invention Patents CN 101882819 A and CN 101795048 B show a primary and secondary tubular permanent-magnet (TPM) motor, respectively. It can be noticed that the primary PM motor greatly increased the amount of PMs, while the secondary PM tubular motor increased the length of the armature. These all greatly increase the cost of design and production, and seriously hinder the application and promotion of tubular motor. Compared with dual-stator TPM motor, the single-stator TPM motor has simple structure, and can be easy to produce, thus has lower cost of design and production. In addition, the low loss and easy heat dissipation of the single-stator TPM motor are also the main reasons for its wide using. However, dual-stator tubular motor has become a research hotspot with the advantages of high mechanical integration, high space utilization, high thrust density and low thrust force fluctuation.

In addition, the switch-flux TPM linear synchronous motor can be used to decrease the cost caused by the long armature and magnetic pole structure. Because PMs are sandwiched by armatures, which are placed on the stator or the mover, so the amount of PM and cost is great decreased. However, new problems are produced: the heat dissipation condition is too bad due to the PMs being enclosed by the armatures, the motor temperature rises seriously; the slot area and PM position interact with each other, thus the thrust force density is limited severely and the efficiency of motor is decreased.

When the fault-tolerant motor is with one or two short-circuit phase faults, the motor still has a capability of output certain thrust force or torque. However, the thrust force or torque is seriously distorted, and the noise is also increased greatly, which seriously affect the system performance. The FTC goal is to optimize the fault-tolerant current for different applications, and then the output thrust force or torque can be as smooth as possible under the fault condition. And furthermore, the faulty motor performance can reaches or approaches that in the healthy condition. The Chinese invention patent 201510059387.2 is "A short-circuit fault-tolerant control method for five-phase fault-tolerant permanent-magnet motor". The five-phase surface mounted PM rotating motor was with short-circuit phase fault. The impact of short-circuit fault on motor torque is decomposed into two parts: one is the impact of open-circuit fault on torque; the other is the influence of short-circuit current on torque. By using the principle of the constant magneto-motive forces (MMFs) both in pre- and pro-fault conditions and the constraint of the equal amplitudes of the remaining healthy phase currents, the remaining healthy phase currents were optimized under the open-circuit fault condition. To restrain the torque fluctuations caused by the short-circuit current, the healthy phase compensatory currents were obtained according to the principle that MMFs was zero and copper loss was minimum under fault condition. Finally, the current references of the remained healthy phase were obtained by adding the two currents. According to the obtained remaining healthy phase currents, the current hysteresis control strategy was adopted to control the five-phase surface mounted PM rotating motor. In this method, the amplitude of the compensatory currents in the remaining healthy phases is constant, which used to suppress the torque fluctuations caused by short-circuit currents. The amplitude of the compensatory currents has no relation to the motor speed, and the sum of the compensatory currents in the remaining healthy phases is not zero. Meanwhile, this method is not suitable for fault-tolerant operation in double-phase faults (open-circuit, short-circuit or one phase open-circuit and another phase short-circuit). Currently, the common FTC method is always to calculate the fault-tolerant currents and then to use the current hysteresis control strategy. However, this method has problems such as: disordered switching frequency, large noise, and poor dynamic performance. Hence, it is not suitable for applications of high power and strict requirements on dynamic performance. The Chinese invention patent 201510661212.9 is "A short-circuit fault-tolerant field-oriented control method of interior hybrid magnetic material fault-tolerant tubular linear motor". It is aimed that five-phase hybrid magnetic material interior fault-tolerant linear motor under one short-circuit phase faults. The aforementioned method was used to optimize the remaining healthy currents, then the field-oriented control strategy was used to realize the field-oriented control operation under one short-circuit phase fault. Although high fault-tolerant performance, high dynamic performance, and good current tracking ability are achieved under short-circuit phase fault condition, this method cannot achieve field-oriented control under double-phase fault condition (open-circuit, short-circuit, or one phase open-circuit and another phase short-circuit).

Contents of the Invention

Due to the current technology of tubular motor and the aforementioned technical problems, the invention proposes a TVPM motor for electromagnetic suspension and its FT-FOC method under adjacent double-phase short-circuit faults. PMs are separated from the armature to realize the separation of the armature and the PMs. This can greatly improve the motor space utilization rate, increase the thrust force density, and reduce the thrust force fluctuation. Also, it can reduce amount of PMs and the length of the armature, and decrease the cost of the design and production. Especially, the heat dissipation pressure of the motor is reduced, and the unsprung mass of the electromagnetic suspension is greatly reduced. Additionally, the dynamic performance of the electromagnetic suspension is also improved.

Due to the shortcomings of the existing FTC technology for motor, according to the characters of the five-phase TVPM motor for electromagnetic suspension and the adjacent double-phase faults (open-circuit, short-circuit, or one phase open-circuit and another phase short-circuit), the invention is to overcome problems caused by the existing FTC strategy with current hysteresis under the adjacent double-phase faults (open-circuit, short-circuit, or one phase open-circuit and another phase short-circuit), such as disorder switching frequency of inverter, deteriorated motor response speed, poor dynamic performance, the inaccurate current tracking performance, the serious noise, and the difficult parameter adjustment problem caused by the conventional current PI control due to the contradiction between the rapid response and the overshoot. Additionally, the existing FT-FOC strategy cannot realize the fault-tolerant operation in double-phase faults (open-circuit, short-circuit, or one phase open-circuit and another phase short-circuit). Hence, the invention proposes FT-FOC method of five-phase TVPM motor for electromagnetic suspension with adjacent double-phase short-circuit faults. This method achieves the accurate estimation of back electromotive forces (EMFs), and it reduces the difficult parameter adjustment. High fault-tolerant operation performance, high dynamic performance and good current tracking ability can be obtained under adjacent double-phase faults (open-circuit, short-circuit, or one phase open-circuit and another phase short-circuit). Also, the low CPU cost, constant inverter switching frequency and low noise can be achieved. Furthermore, the reliability and dynamic performance of the five-phase TVPM motor for electromagnetic suspension is improved under adjacent double-phase fault condition (open-circuit, short-circuit, or one phase open-circuit and another phase short-circuit). It also can solve any fault about the adjacent double-phase faults (open-circuit, short-circuit, or one phase short-circuit and one phase open-circuit), and has good versatility.

SUMMARY OF THE PRESENT INVENTION

The following is the invention device:

TVPM motor for electromagnetic suspension consists of the inner stator, the outer stator and the long mover which is between the inner stator and the outer stator. The inner stator and the outer stator are equal in length and are smaller than the long mover in length. One side of inner stator and one side of the outer stator are connected as a whole by an E-shaped non-ferromagnetic tube which directly fixed to the carriage. Suspension spring is installed in the long mover and between the long mover and E-type non-ferromagnetic tube, and the other side of the long mover is directly connected with the chassis or the tire. The opening direction of the E-type non-ferromagnetic tube is the direction of the long mover movement.

The air gaps $g_1$ and $g_2$ exist between the inner stator and the long mover, the outer stator and the long mover, respectively; the air gaps $g_1$ and $g_2$ should satisfy $g_1 > g_2$, they are both greater than zero; the inner stator and the outer stator have different structures; the PMs are surface mounted or embedded in the inner stator, while the coils are installing in the outer stator.

The described long mover is composed of $n_c$ pieces of flux-modulated rings which are arranged uniformly along the axial direction of the motor; both the flux-modulated rings and the inner stator armatures are made of permeability magnetic material; the number of the flux-modulated rings $n_c$, the number of PM pole pairs $n_p$ and the number of motor winding pole pairs $n_w$ need to satisfy the following relationship: $n_c = n_p + n_w$; then vernier modulated effect can be achieved.

Further, the described outer stator includes outer stator armature iron core, coil windings, armature teeth, and fault-tolerant teeth (FTT). The outer stator armature iron core is made of permeability magnetic material. The number of the armature teeth is equal to that of the FTT, and the FTT interleaving the armature teeth are employed. FTT is placed between the adjacent double armature teeth. The radial thickness of FTT is equal to the sum of the thickness of pole shoe and armature tooth. The axial thickness of armature tooth is greater than that of FTT and less than that of the pole shoe. The described windings are m phases, and m is a positive integer which is no less than 1. Each phase winding has two sets of coils, and the fractional-slot concentrated-windings are adopted. Only one coil is placed in each armature slot. Then the number of armature teeth and FTT is 2m.

Furthermore, the described PMs on the inner stator can be adopted with radial consequent pole excitation mode, radial alternating excitation mode, axial alternating excitation mode, or Halbach arrays excitation mode.

When the PMs are adopted radial consequent pole excitation mode or radial alternating excitation, the PM is axially segmented to reduce eddy current loss.

When the described PMs are in Halbach arrays form to enhance flux-concentrating effect, each pair of PMs has two PM arrays, which consist of several odd-numbered PMs. The middle PM is alternately excited in the radial direction, while the magnetic directions of the PMs on both sides are pointed into the middle radial excited PM in the axial direction. The inner stator PM pole pairs is $n_p$.

Further, the motor is suitable for tubular motor with pole-slot ratio $2*n_p/n_s$. It is only necessary to adjust the number of the flux-modulated rings to satisfy the modulation ratio relationship according to different pole-slot ratio. Then, the modulation effect is achieved.

The following is technical solution of the invention:

FT-FOC method of five-phase TVPM motor for electromagnetic suspension under adjacent double-phase short-circuit faults includes following steps:

(1) Five-phase TVPM motor for electromagnetic suspension model is established.

(2) TVPM motor has five phases such as phase-A, phase-B, phase-C, phase-D, and phase-E. When the motor has phase-C and phase-D short-circuit faults, it is assumed that only the open-circuit faults occur in phase-C and phase-D. According to the principle that the traveling wave MMFs is constant before and after the fault occurrence, the constraint that the sum of remaining healthy phase currents is zero, and the amplitudes of currents in healthy phase-B and phase-E are equal. The fault-tolerant currents can be obtained after the open-circuit faults occurrence to phase-C and phase-D.

(3) According to the healthy phase currents, the generalized Clark transform matrix $T_{post}$ used to transform the variables in healthy three-phase natural frame into the two-phase stationary frame can be derived, and then the inverse transform matrix $T_{post}^{-1}$ and transposed matrix $T_{post}^{T}$ can be obtained.

(4) The healthy currents are used to suppress the thrust force fluctuations caused by the fault-phase short-circuit currents. Then, the short-circuit compensatory currents in the healthy phases, which are used to restrain the thrust force fluctuations caused by the fault-phase short-circuit currents, can be obtained. Furthermore, these currents can be transformed to the compensatory currents in two-phase stationary frame by the generalized Clark transform matrix $T_{post}$.

(5) The remaining three healthy phase currents sampled in natural frame can be transformed to the currents in the two-phase stationary frame by the generalized Clark transform matrix $T_{post}$. Then, the currents ($i_\alpha$, $i_\beta$) can be obtained by the aforementioned currents in (5) subtracting the currents obtained in (4). The currents ($i_\alpha$, $i_\beta$) can be transformed into the synchronous rotating frame by the Park transformation matrix $C_{2s/2r}$.

(5') The currents ($i'_A$, $i'_B$, $i'_E$) can be obtained by the remaining three healthy phase currents subtracting the healthy phase compensatory currents. Then, by using the generalized Clark transformation matrix $T_{post}$ and Park transformation matrix $C_{2s/2r}$, the currents ($i'_A$, $i'_B$, $i'_E$) can be transformed to the feedback currents in the synchronous rotating frame.

(6) Mathematical model of the five-phase TVPM motor under the two adjacent short-circuit phase faults in the synchronous rotating frame is established.

(7) The feedforward compensatory voltages can be obtained by designing a first-order inertia feedforward voltage compensator. At the same time, the control voltages can be obtained by the differences between the current references and the feedback currents via the current internal mode controller. Then, voltage references are obtained in synchronous rotating frame by the control voltage adding the feedforward voltages. Furthermore, this voltage references can be transformed to the voltage references ($u^*_\alpha$, $u^*_\beta$) in the two-phase stationary frame by the Park inverse transformation matrix $C_{2r/2s}$.

(8) The $T_{post}^{T}$, the $C_{2r/2s}$, and the mover PM flux linkage are used to design the observer to estimate the back EMFs in the remaining healthy phases. Then, the back EMFs in fault phases can be obtained according to the EMFs in healthy phases.

(9) To ensure the motor output the short-circuit compensatory currents, which are used to restrain the torque fluctuations caused by the short-circuit currents, the short-circuit compensatory voltages in the remaining healthy phases are defined according to the relationship between phase-C short-circuit current and its back EMF, the relationship between phase-D short-circuit current and its back EMF, and the mathematical expression of short-circuit compensatory currents. Then, the short-circuit compensatory voltages are transformed into the two-phase stationary frame by using generalized Clark transform matrix $T_{post}$.

(10) The voltage references ($u^{}_\alpha$, $u^{}_\beta$) in two-phase stationary frame can be obtained by adding the voltage references ($u^*_\alpha$, $u^*_\beta$) and the short-circuit compensatory voltages, then the voltage references ($u^{}_\alpha$, $u^{}_\beta$) are transformed to the voltage references ($u^*_A$, $u^*_B$, $u^*_E$) in the natural frame by using the generalized Clark inverse transformation matrix $T_{post}^{-1}$. Finally, the expected voltage commands ($u^{}_A$, $u^{}_B$, $u^{**}_E$) are obtained by adding the voltages references ($u^*_A$, $u^*_B$, $u^*_E$) and the remaining healthy phase back EMFs, respectively.

(10') The voltage references ($u^*_\alpha$, $u^*_\beta$) in two-phase stationary frame can be transformed to the voltage references ($u^*_A$, $u^*_B$, $u^*_E$) in the natural frame by using the generalized Clark inverse transformation matrix $T_{post}^{-1}$. Then, the desired phase voltage references ($u^{}_A$, $u^{}_B$, $u^{**}_E$) are obtained by adding the voltage references ($u^*_A$, $u^*_B$, $u^*_E$), the remaining healthy phase compensatory voltages and the remaining healthy phase back EMFs.

(11) The expected phase voltage references ($u^{}_A$, $u^{}_B$, $u^{**}_E$) obtained in step (10) are fed into the voltage source inverter using CPWM modulation technology, then the disturbance-free operation of five-phase TVPM motor for electromagnetic suspension is achieved under adjacent double-phase short-circuit fault condition.

When phase-C and phase-D happen open-circuit faults, the short-circuit compensatory currents in step (4) should be set to zero, and the short-circuit compensatory voltages in step (9) should be set to zero too. The five-phase TVPM motor for electromagnetic suspension can be disturbance-free operation under adjacent double-phase open-circuit faults by using the proposed FT-FOC strategy.

When phase-C happens open-circuit fault and phase-D happens the short-circuit fault, the short-circuited compensatory current in phase-C is set to $i_{sc\_C}=0$ in step (4), and the short-circuited compensatory voltage in phase-C is set to $e_C=0$ in step (9). The five-phase TVPM motor can be disturbance-free operation under phase-C open-circuit fault and phase-D short-circuit fault by using the proposed FT-FOC strategy.

When phase-C happens short-circuit fault and phase-D happens open-circuit fault, the short-circuited compensatory current in phase-D is set to $i_{sc\_D}=0$ in step (4), and the short-circuited compensatory voltage in phase-D is set to $e_D=0$ in step (9). The five-phase TVPM motor can be disturbance-free operation under phase-C short-circuit fault and phase-D open-circuit fault by using the proposed FT-FOC strategy.

The invention has the following beneficial effects:

1. The separation and independence of the stator armature windings and the PMs are realized by the dual stator structure of the invention. The invention solves the problems, such as the low utilization of the motor space resulted from the stator slot area occupied by PMs, and the difficult heat dissipation of PMs in the armature windings. The FTT with small axial width are introduced into the outer stator core, which can physically isolate between phases without affecting the slot area. Also, electrical and thermal isolation and magnetic-circuit decoupling are achieved with the special design. Then, the motor has good fault tolerance. Therefore, the motor has good application prospect in the field of vehicle suspension system with high reliability requirement. In addition, the PMs are independent from the outer stator armature and shifted into the inner stator, which greatly reduces the amount of PMs, also saves the design and processing cost of the motor and facilitates heat dissipation of PMs.

2. Long mover is composed of $n_c$ pieces of flux-modulated rings arranged evenly along the axial direction, then the assembly of long mover parts can be easily achieved, and the modulation effect can be realized by adjusting the number of flux-modulated rings according to different pole slot ratios which is used to satisfy the modulation ratio relationship. The combination of dual stator structure and vernier motor greatly increases the thrust force density, reduces the thrust force pulsations and improves the motor efficiency. Additionally, the combination of tubular motor and vernier effect allows the motor to have greater thrust density and higher efficiency. Thus, the entire electromagnetic suspension system has faster response speed and greater stability.

3. The combination of the dual stator tubular vernier motor and the electromagnetic suspension solves the problems that traditional tubular PM motor has insufficient thrust force under same volume. Hence, thrust force requirement of the electromagnetic suspension can be effectively satisfied. Meanwhile, the unsprung weight of electromagnetic suspension is greatly reduced, the response speed of the suspension system is improved, thus improving the dynamic performance of the electromagnetic suspension system.

4. The invention has various PM excitations and placement methods. And it can choose one suitable PM excitation and placement method according to different needs and application fields. The excitation method of the PM array enhances flux-concentrating effect, then it greatly increases the thrust force and the PM utilization efficiency. In addition, when the PMs are excited in the radial unipolar excitation direction or the radial alternating excitation direction, the PMs are axially segmented to reduce the eddy currents loss, thus improving the efficiency of the motor.

5. The invention can not only ensure fault-tolerant operation of the motor under adjacent double-phase faults (open-circuit, short-circuit, or one phase open-circuit and another phase short-circuit), but also realize the same good dynamic performance, current tracking performance as that under healthy condition 6. The invention ensures the thrust force invariable before and after the any adjacent double-phase faults, such as open-circuit faults, short-circuit faults, or one phase open-circuit fault and another phase short circuit fault. Furthermore, it can not only suppress the thrust force fluctuations, but also achieve the same good dynamic performance, current tracking performance in fault-tolerant operation as that in healthy condition. Additionally, no complicated calculation is required, the voltage source inverter has constant switching frequency, low noise, and small CPU overhead. Therefore, it can solve any adjacent double-phase faults, such as short-circuit, open-circuit, one phase short-circuit fault and another phase open-circuit fault. Thus, it has good versatility.

7. When the invented FT-FOC strategy is activated after phase-C and phase-D short-circuit faults occurrence, the dynamic and steady-state performance of the motor is the same as that in healthy operation. The output thrust force almost has no fluctuation. The thrust force is the same as that in healthy operation under the maximum current limit. Hence, disturbance-free operation is achieved.

8. The currents are obtained by subtracting the short-circuit compensatory currents from steady-state currents in the remaining healthy phases under the adjacent double-phase short-circuit faults. When they are transformed into the synchronous rotating frame by using the generalized Clark transform matrix and the Park transform matrix, they have no pulsation. However, if the traditional Clark transform matrix and the Park transform matrix are used, the currents under adjacent double-phase short-circuit faults transformed from the remaining healthy phase currents would be the pulsating currents in the synchronous rotating frame.

9. The natural frame composed of the remaining healthy phases can be transformed to the synchronous rotating frame under adjacent double-phase faults (open-circuit, short-circuit, or one phase open-circuit and another phase short-circuit) by the combination of the generalized Clark transformation matrix and the Park transformation matrix. It creates precondition for FT-FOC under the two adjacent short-circuit phase faults.

10. The accurate estimation of the back EMF under two adjacent phase faults (open-circuit, short-circuit or one phase open-circuit and another phase short-circuit) is realized by the combination of the generalized Clark transform transposition matrix, Park inverse transformation matrix and the PM flux linkage of the mover. Hence, the FT-FOC operation under the two adjacent phase faults (open circuit, short circuit or one open-circuit phase and one short-circuit phase) is realized.

11. Compared with current PI controller, the nonlinear and strong coupling system is transformed to first-order inertial system under the two adjacent phase faults (open-circuit, short-circuit or one phase open-circuit and another phase short-circuit) by combination of the current internal model controller, the generalized Clark inverse transformation matrix, the Park inverse transformation matrix, the back EMF observer and the first-order inertia feed-forward voltage compensator. Hence, the difficulty of setting controller parameters is reduced, the current tracking performance, steady state and dynamic performance of the motor system under two adjacent phase faults (open-circuit, short-circuit or one phase open-circuit and one phase short-circuit) are ensured. Also, the dynamic and steady-state performance are with the same as that under healthy condition, especially the fast response without overshoot is achieved.

12. The inverter DC-bus voltage utilization is improved and the complexity of the FT-FOC algorithm and the CPU overhead are reduced by the combination of the generalized Clark transform matrix, the Park transform matrix and the CPWM modulation based on zero-sequence voltage harmonic injection.

13. The combination of FT-FOC strategy, back EMF estimation, current internal mode control strategy, first-order inertia feed-forward voltage compensation, CPWM modulation technology, and five-phase TVPM motor for electromagnetic suspension greatly increases the fault-tolerant performance, dynamic and steady-state performances under the adjacent double-phase fault condition, such as open-circuit faults, short-circuit faults or one phase open-circuit fault and another phase short-circuit fault. Also, the CPU overhead is saved. Compared with current hysteresis control, the noise and the difficulty of electromagnetic compatibility design are reduced. Furthermore, the motor has high control precision, good current tracking performance, high efficiency and fast response of thrust force under the adjacent double-phase faults (open-circuit, short-circuit or one phase open-circuit and another phase short-circuit) are achieved, and the thrust force pulsations are as small as that under healthy condition. High reliability and high dynamic performance of the motor system under adjacent double-phase faults (such as open-circuit, short-circuit or one phase open-circuit and another phase short-circuit) are realized.

In the Figure: 1 represents outer stator, 2 represents coil windings, 3 represents armature teeth, 4 represents FTT, 5 represents long mover, 6 represents flux-modulated ring, 7 represents inner stator, 8 represents PM, 10 represents suspension spring, 11 represents chassis, 12 represents pole shoe.

DETAILED DESCRIPTION OF THE PRESENT INVENTION

The following is detailed description about technical solutions of the present invention.

In order to simpler and clearer illustrate the structure characteristic and beneficial effect of the five-phase TVPM motor for electromagnetic suspension, a specific five-phase TVPM motor for electromagnetic suspension is stated in the following.

(1) A model of five-phase TVPM motor for electromagnetic suspension is established.

In order to more clearly illustrate the present invention, the number of the motor phase is m=5. The corresponding number of motor slots is $n_s$=20, concentrated winding and phase separation mode are adopted.

Figure 1:
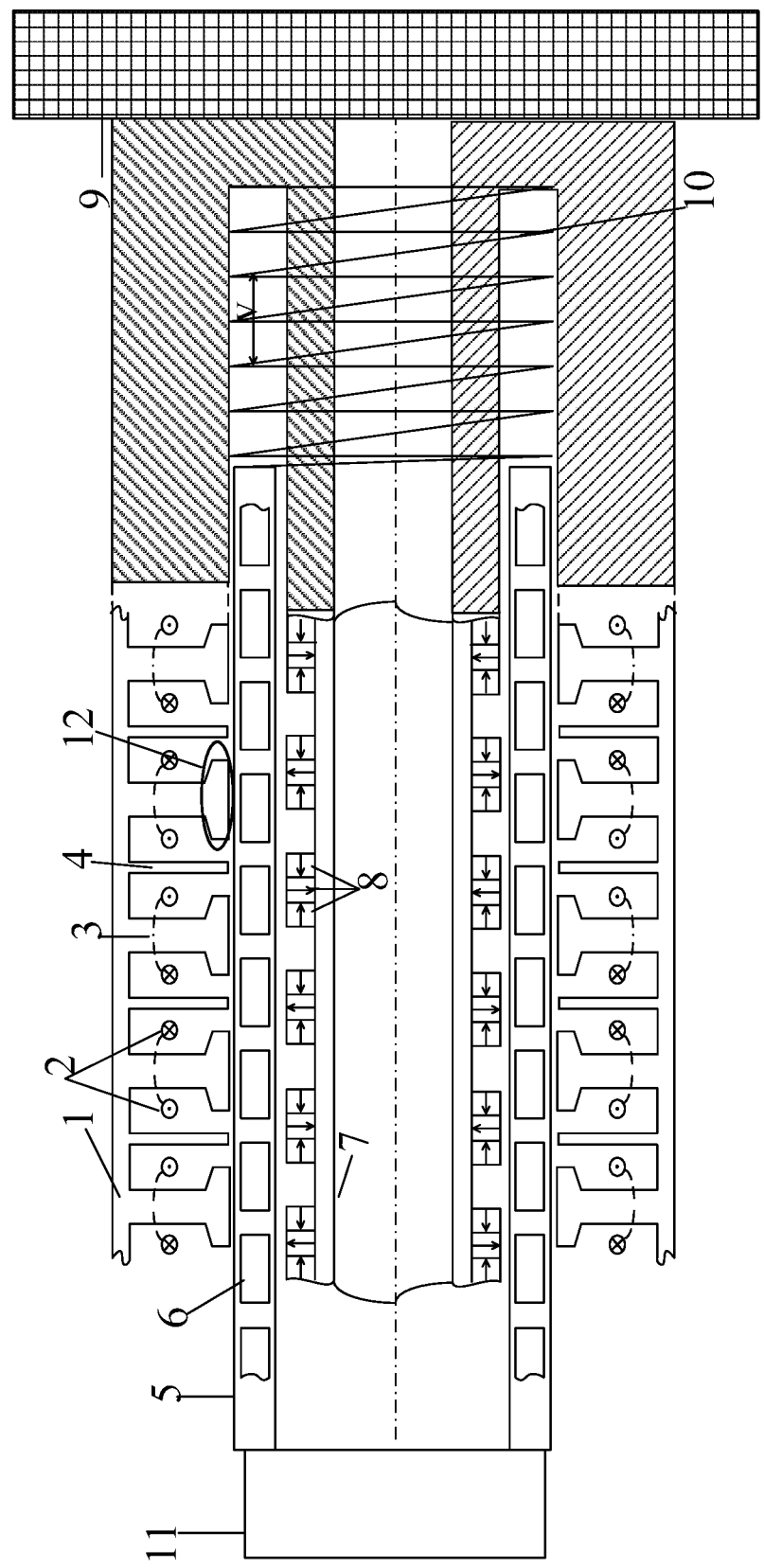
FIG. 1 shows the topology of TVPM motor for electromagnetic suspension of the invention.
Figure 2:
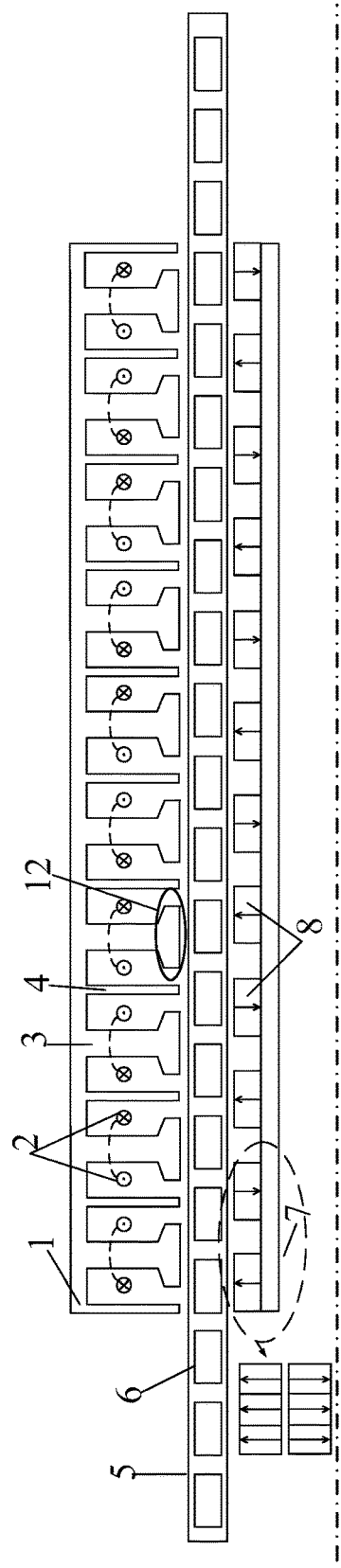
FIG. 2 shows the topology of five-phase TVPM motor for electromagnetic suspension of the invention as case 1.

Example 1 of the present invention is shown in FIG. 2. Five-phase TVPM motor for electromagnetic suspension includes: inner stator, outer stator, and long mover which is placed between the inner stator and outer stator. The length of the two stators is less than the length of the long mover. The inner stator and the outer stator are connected as a whole by E-shaped non-magnetic material tube. The E-type non-magnetic material tube is directly connected to the carriage, and welding method can be used in the invention. Suspension spring is placed between the motor long mover and the E-type non-magnetic material tube. The other side of the long mover is directly connected to the chassis or the tire, and welding can be adopted. The opening direction of the E-shaped non-magnetic material tube is the moving direction of the long mover. The inner stator, the outer stator and the long mover have air gaps $g_1$ and $g_2$ respectively. Considering the curvature effect of the tubular linear motor, the air gaps $g_1$ and $g_2$ should satisfy: $g_1>g_2$, The TVPM motor adopts: $g_1=g_2+0.2$ mm. Outer stator includes FTT and armature teeth, both of them are 2*m=10 and arranged alternately. Also, FTT is disposed between the two adjacent armature teeth. The radial thickness of the FFT is equal to the sum of radial thickness of the pole shoe and armature teeth. Axial thickness of the armature teeth is greater than axial thickness of the FTT and less than the pole shoe. The FTT acts as physical isolation between the phases. Also, electrical isolation, thermal isolation and magnetic decoupling between phases are achieved. Hence, it has good fault tolerance. The coil winding is wound in round-cake method. It is placed in the outer stator slots, and the winding phase separation is adopted. In order to minimize the size of slot area and increase the space utilization of the motor, the axial width of FTT is set to be much smaller than that of armature teeth.

The long mover of the five-phase TVPM motor is composed of $n_c$ pieces of flux-modulated rings which are uniformly arranged along the axial direction of the motor. The flux-modulated rings are made of permeability magnetic material The number $n_c$ of flux-modulated rings in long mover, whose number $n_c$ is greater than 0, pole pairs of the PM $n_p$ and pole pairs of the motor winding $n_c$ need to satisfy the following relationship $n_c=n_p+n_w$. Hence, vernier modulation effect is realized. The long mover is designed as the flux-modulated rings. Thus, it is to facilitate the assembly of the long mover. And it is easy to adjust the number of the flux-modulated rings to satisfy the modulation ratio relationship according to different pole-slot ratios. Then, the modulation effect is achieved. The pole number of the PM is $n_p$=6, and pole pairs of the coil windings are $n_w$=9. Hence, the number of flux-modulated rings in the long mover is $n_c$=9+6=15. The non-magnetic material, which is composed of air or other solid or liquid, is placed between the adjacent double-pieces of flux-modulated rings in long mover of the invention, Therefore, the dimensional accuracy can be ensured and the long mover can be conveniently fixed by means of liquid injection.

Radial consequent-pole excitation mode, radial alternating excitation mode, axial alternating excitation mode or Halbach array excitation mode can be adopted in the PM on the inner stator of the present invention. These excitating and placement mode can be selected according to different needs and application fields. The five-phase TVPM motor for electromagnetic suspension of the invention which shown in FIG. 2 is radial alternating excitation mode. The enlarged part in the FIG. 2 shows the segment of radially alternating PMs in the axial direction, which is used to reduce the eddy current loss in the PMs and improve the efficiency of the motor. The side of the suspension spring is only connected to the long mover, and the other side of the long mover is directly connected to the chassis or the tire, which greatly reduces the unsprung mass of the system. Hence, the suspension system can possess better dynamic response capability and vehicle handling.

The invention places PM on the inner stator. After PM flux in the inner-stator passing through the long mover, it enters into the outer stator armature, then, it interlink with the armature winding. Obviously, when the relative positions of the inner stator and the long mover are different, the flux of the inter-linkage in the armature winding changes, and then, almost sinusoidal back EMFs are generated in the armature coil windings. Therefore, when the armature coil windings are fed by five-phase sinusoidal currents, the electromagnetic thrust is generated, and the long mover is pushed to do reciprocating linear motion in the opening direction of the E-shaped non-magnetic material tube.

Figure 3:
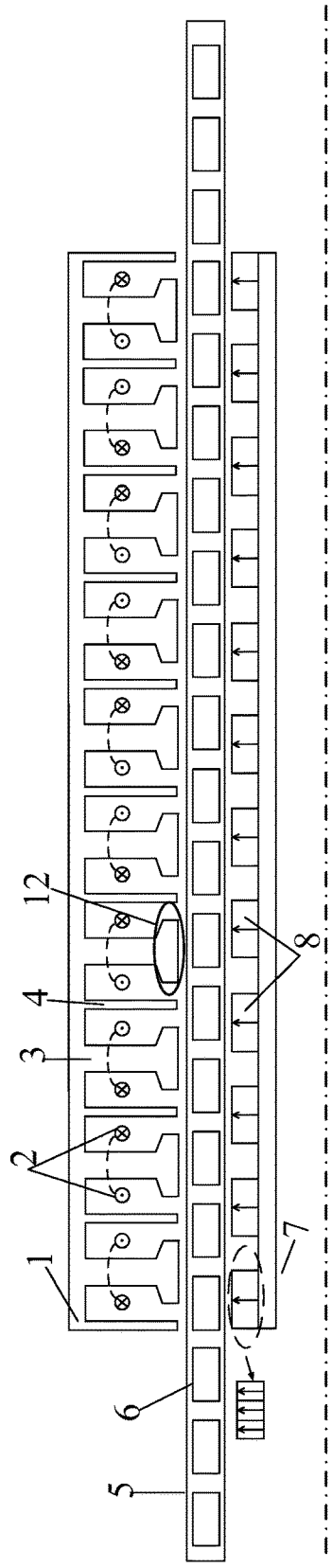
FIG. 3 shows the topology of five-phase TVPM motor for electromagnetic suspension of the invention as case 2.
Figure 4:
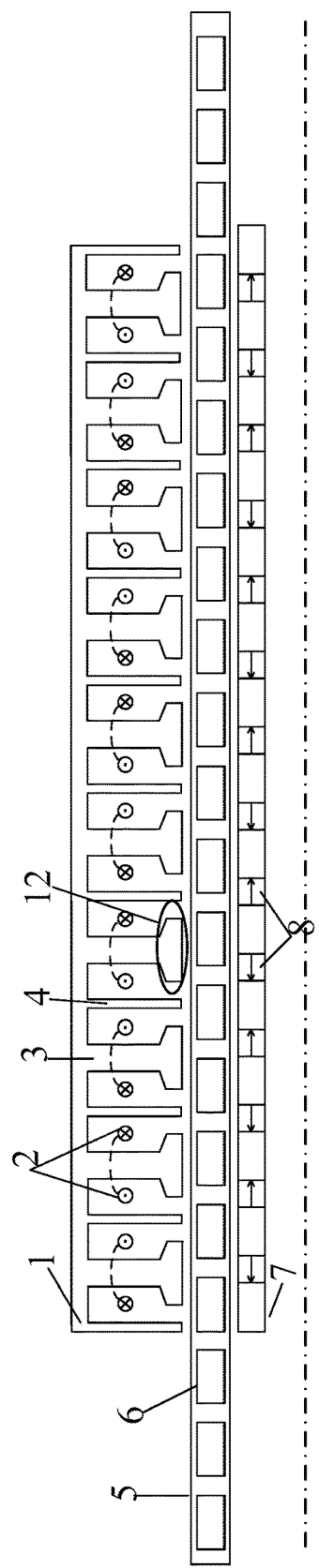
FIG. 4 shows the topology of five-phase TVPM motor for electromagnetic suspension of the invention as case 3.
Figure 5:
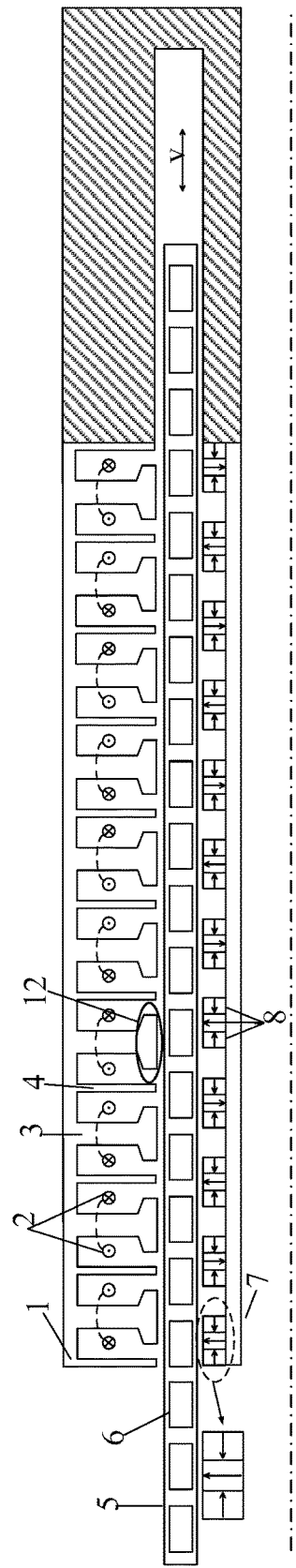
FIG. 5 shows the topology of five-phase TVPM motor for electromagnetic suspension of the invention as case 4.

FIG. 3 shows the topology of five-phase TVPM motor for electromagnetic suspension as described in Example 2 of the present invention. Radial consequent-pole excitation mode is adopted in the PM of the present invention. The PM can be segmented in the axial direction to reduce the eddy current loss in the PM as described in the Example 1. FIG. 4 shows the topology of five-phase TVPM motor for electromagnetic suspension as described in Example 3 of the present invention. Axial alternating excitation mode is adopted in the PM. The topology of five-phase TVPM motor for electromagnetic suspension as described in Example 4 of the present invention is shown in FIG. 5. A Halbach array excitation mode is adopted in the PMs. Each pair of PMs has two PM arrays, each PM array is composed of three PMs, and the middle PMs are alternately excited in the radial direction. The both side PMs are axial magnetized and directed to the middle PM. The array excitation mode acts as flux-concentrating effect, which greatly increases the motor thrust force and the utilization efficiency of the PM.

According to the aforementioned, the PMs of the TVPM motor for electromagnetic suspension of the present invention are separated from the armature windings. The separation of armature windings and the PMs is realized. Thus, the space utilization rate of the motor is great increased. It not only increases the thrust force density, but also reduces the thrust fluctuations. Also, the problem of heat dissipation about the PMs in the armature windings is solved. The FTT with small axial width is introduced into the outer stator, physical isolation between phases is achieved without affecting the area of the slot. Hence, electrical and thermal isolation, and magnetic circuit decoupling between phases are realized, thus obtaining good fault tolerance. Hence, the proposed motor has a good application prospect in the field of automobile suspension systems with high reliability requirements.

According to the traditional carrier-based pulse width modulation (CPWM) method by using sinusoidal wave as modulated wave, the CPWM method can achieve the same flux-linkage control effect as five-phase SVPWM method, when five-phase sinusoidal modulation waves are injected with $c_0 = -(\max(u_i) + \min(u_i))/2$ zero sequence voltage harmonic ($u_i$ is the each-phase function of five-phase sine-modulation wave) in CPWM method. Hence, the CPWM method based on injection of zero-sequence voltage harmonics is adopted in the present invention.

Figure 6:
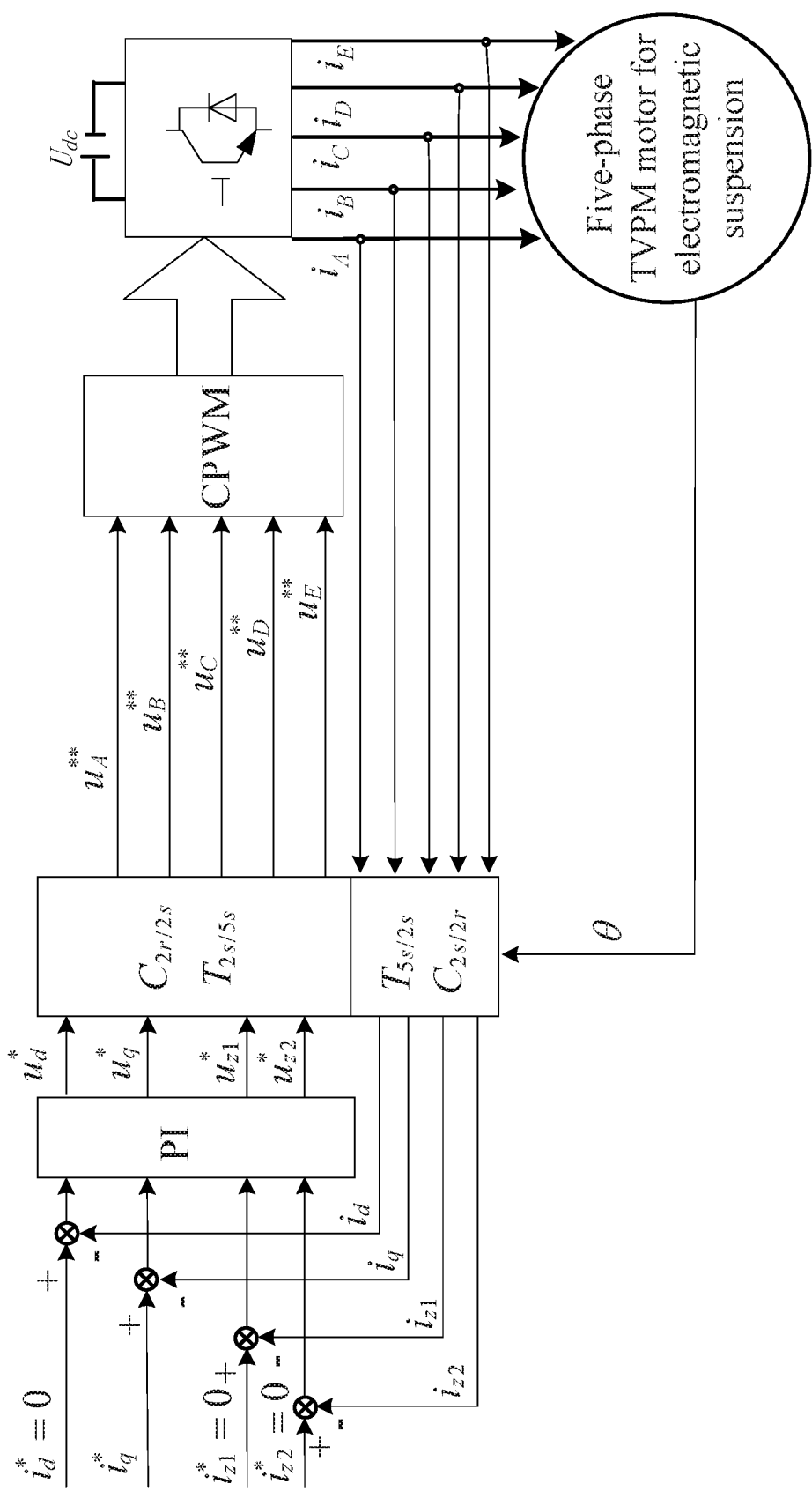
FIG. 6 shows the block diagram of FOC strategy of TVPM motor for electromagnetic suspension of the invention.

Five-phase TVPM motor for electromagnetic suspension is powered by voltage source inverter, the motor is divided into phase-A, phase-B, phase-C, phase-D, phase-E. Field-oriented control strategy with CPWM technology based on zero-sequence voltage harmonic injection is adopted. Zero-sequence current is controlled to zero, and the control block diagram is shown in FIG. 6. When the motor operates in healthy condition, the phase currents can be expressed as $$\begin{cases} i_A^* = -i_q^* \sin(\theta) + i_d^* \cos(\theta) \\ i_B^* = -i_q^* \sin(\theta - 2\pi/5) + i_d^* \cos(\theta - 2\pi/5) \\ i_C^* = -i_q^* \sin(\theta - 4\pi/5) + i_d^* \cos(\theta - 4\pi/5) \\ i_D^* = -i_q^* \sin(\theta - 6\pi/5) + i_d^* \cos(\theta - 6\pi/5) \\ i_E^* = -i_q^* \sin(\theta - 8\pi/5) + i_d^* \cos(\theta - 8\pi/5) \end{cases} \quad (1)$$

where $i^*_d$ and $i^*_q$ are current references for the d-axis and q-axis in the synchronous rotating frame, respectively. $\theta$ is the electrical angle, $$\theta = \int \frac{\pi v}{\tau} dt.$$

$v$ is the electrical velocity of linear motor, and $\tau$ is the pole pitch.

The traveling wave MMFs generated by the motor can be expressed as $$\begin{aligned} MMF &= \sum_{i=A}^{E} MMF_i \\ &= Ni_A + aNi_B + a^2 Ni_C + a^3 Ni_D + a^4 Ni_E \end{aligned} \quad (2)$$

where $a = e^{j2\pi/5}$, N is the effective turns of the each-phase stator-windings.

(2) When the phase-C and phase-D short-circuit faults occur, it is assumed that only the open-circuit fault happens in phase C and phase D. According to the principle that the traveling wave MMFs is constant before and after the fault, the constraint conditions that the sum of the remaining healthy phase currents is zero, and t the amplitudes of currents in the non-adjacent double-phase phase-B and phase-E are equal, the fault-tolerant currents in healthy phases can be obtained under phase-C and phase-D open-circuit faults.

Part One

When short-circuit faults occur on two adjacent phases of the motor, it is assumed that the phase-C and the phase-D short-circuit faults occur. The remaining healthy phase currents of the motor are used to compensate for the lose thrust force caused by the short-circuit fault phases. Then, it is assumed that the phase-C and phase-D open-circuit occur, and the traveling wave MMFs is generated by the remaining three healthy phase windings, which can be expressed as $$\begin{aligned} MMF &= \sum_{i=A,B,E} MMF_i \\ &= Ni_A^* + aNi_B^* + a^4 Ni_E^* \end{aligned} \quad (3)$$

In order to realize the disturbance-free operation under adjacent double-phase open-circuit faults, it is necessary to keep the traveling wave MMFs constant before and after the fault. Hence, the remaining healthy phase currents are adjusted to keep the constant amplitude and velocity of the traveling wave MMFs before and after the fault. Thus, the real part and the imaginary part in the equations (2) and (3) need to be equal.

The motor windings are connected as star-shape, and its center point is not connected to the middle point of the DC bus voltage. Hence, the sum of the phase currents is zero. Healthy phase currents can be optimized according to the principle that the amplitudes of adjacent double-phase currents are equal. Thus, assuming $$\begin{cases} I_B = I_E \\ i_A^* + i_B^* + i_E^* = 0 \end{cases} \quad (4)$$

where $I_B$ and $I_E$ are the amplitudes of phase-B and phase-E currents, respectively.

The healthy phase currents are optimized according to the above constraints, and the phase current references in fault-tolerant operation can be expressed as $$\begin{cases} i_A^* = 3.618(-i_q^* \sin(\theta) + i_d^* \cos(\theta)) \\ i_B^* = 2.236\left(-i_q^* \sin\left(\theta - \frac{4}{5}\pi\right) + i_d^* \cos\left(\theta - \frac{4}{5}\pi\right)\right) \\ i_C^* = 0 \\ i_D^* = 0 \\ i_E^* = 2.236\left(-i_q^* \sin\left(\theta + \frac{4}{5}\pi\right) + i_d^* \cos\left(\theta + \frac{4}{5}\pi\right)\right) \end{cases} \quad (5)$$

By using matrix expression, it can be expressed as $$\begin{bmatrix} i_A^* \\ i_B^* \\ i_E^* \end{bmatrix} = 2.236 \begin{bmatrix} 1.618 \cos 0 & 0 \\ \cos\frac{4\pi}{5} & \sin\frac{4\pi}{5} \\ \cos\left(-\frac{4\pi}{5}\right) & \sin\left(-\frac{4\pi}{5}\right) \end{bmatrix} \begin{bmatrix} \cos\theta & -\sin\theta \\ \sin\theta & \cos\theta \end{bmatrix} \begin{bmatrix} i_d^* \\ i_q^* \end{bmatrix} \quad (6)$$

Then, it can be further expressed as $$\begin{bmatrix} i_\alpha^* \\ i_\beta^* \end{bmatrix} = \begin{bmatrix} \cos\theta & -\sin\theta \\ \sin\theta & \cos\theta \end{bmatrix} \begin{bmatrix} i_d^* \\ i_q^* \end{bmatrix} = C_{2r/2s} \begin{bmatrix} i_d^* \\ i_q^* \end{bmatrix} \quad (7)$$

$$\begin{bmatrix} i_A^* \\ i_B^* \\ i_E^* \end{bmatrix} = 2.236 \begin{bmatrix} 1.618 \cos 0 & 0 \\ \cos\frac{4\pi}{5} & \sin\frac{4\pi}{5} \\ \cos\left(-\frac{4\pi}{5}\right) & \sin\left(-\frac{4\pi}{5}\right) \end{bmatrix} \begin{bmatrix} i_\alpha^* \\ i_\beta^* \end{bmatrix} \quad (8)$$

(3) According to the healthy phase currents, the generalized Clark transform matrix $T_{post}$ with two rows and three columns used to transform the three-phase healthy natural frame to the two-phase stationary frame, its inverse transform matrix $T_{post}^{-1}$ with three rows and two columns, and its transposed matrix $T_{post}^T$ are obtained.

According to equation (8), the transformation matrix used to transform the two-phase stationary frame to the remaining healthy-phase natural frame can be expressed as $$T_{post}^{-1} = 2.236 \begin{bmatrix} 1.618 \cos 0 & 0 & k \\ \cos\frac{4\pi}{5} & \sin\frac{4\pi}{5} & k \\ \cos\left(-\frac{4\pi}{5}\right) & \sin\left(-\frac{4\pi}{5}\right) & k \end{bmatrix} \quad (9)$$

Since the sum of the remaining healthy phase currents is zero, the inverse transformation matrix of equation (9) can be expressed as $$T_{post} = \begin{bmatrix} \frac{1.618 \cos 0}{8.781} & \frac{\cos\frac{4\pi}{5}}{8.781} & \frac{\cos\left(-\frac{4\pi}{5}\right)}{8.781} \\ 0 & \frac{\sin\frac{4\pi}{5}}{1.545} & \frac{\sin\left(-\frac{4\pi}{5}\right)}{1.545} \\ k & k & k \end{bmatrix} \quad (10)$$

where k=3.386.

Since the motor windings are star-connected, the sum of the phase currents is zero. Hence, the third column of equation (9) and the third row of equation (10) can be removed. Then it can be expressed as $$T_{post}^{-1} = 2.236 \begin{bmatrix} 1.618 \cos 0 & 0 \\ \cos\frac{4\pi}{5} & \sin\frac{4\pi}{5} \\ \cos\left(-\frac{4\pi}{5}\right) & \sin\left(-\frac{4\pi}{5}\right) \end{bmatrix} \quad (11)$$

$$T_{post} = \begin{bmatrix} \frac{1.618 \cos 0}{8.781} & \frac{\cos\frac{4\pi}{5}}{8.781} & \frac{\cos\left(-\frac{4\pi}{5}\right)}{8.781} \\ 0 & \frac{\sin\frac{4\pi}{5}}{1.545} & \frac{\sin\left(-\frac{4\pi}{5}\right)}{1.545} \end{bmatrix} \quad (12)$$

The transposed matrix of equation (12) can be expressed as $$T_{post}^T = \begin{bmatrix} \frac{1.618 \cos 0}{8.781} & 0 \\ \frac{\cos\frac{4\pi}{5}}{8.781} & \frac{\sin\frac{4\pi}{5}}{1.545} \\ \frac{\cos\left(-\frac{4\pi}{5}\right)}{8.781} & \frac{\sin\left(-\frac{4\pi}{5}\right)}{1.545} \end{bmatrix} \quad (13)$$

(4) Healthy phase currents are used to suppress the thrust force fluctuations caused by the fault-phase short-circuit currents. Then short-circuit compensatory currents (i"$_A$, i"$_B$, i"$_E$) are obtained which are used to restrain the thrust fluctuations caused by the fault-phase short-circuit currents. The short-circuit compensatory currents (i"$_A$, i"$_B$, i"$_E$) are transformed to the short-circuit compensatory currents (i"$_\alpha$, i"$_\beta$) in the two-phase stationary frame by the generalized Clark transform matrix $T_{post}$.

Since the current in the zero-sequence subspace is zero, it is unnecessary to transform it to the synchronous rotating frame. Energy conversion takes place in the fundamental subspace. Hence, the energy conversion in the fundamental subspace can be transformed into the synchronous rotating frame. The transformation matrix $C_{2s/2r}$ and its inverse transformation matrix $C_{2r/2s}$ used to transform the two-phase stationary frame to the synchronous rotating frame are respectively defined as $$C_{2s/2r} = \begin{bmatrix} \cos\theta & \sin\theta \\ -\sin\theta & \cos\theta \end{bmatrix} \quad (14)$$

-continued $$C_{2r/2s} = \begin{bmatrix} \cos\theta & -\sin\theta \\ \sin\theta & \cos\theta \end{bmatrix} \quad (15)$$

Part Two

Based on the first part, when the short-circuit faults occur, the healthy phase currents are used to suppress the thrust fluctuations caused by the short-circuit phase currents.

Assuming that the short-circuit current in phase-C is $i_{sc\_C} = I_f \cos(\omega t - \theta_{fC})$, and the short-circuit current in phase-D is $i_{sc\_D} = f \cos(\omega t - \theta_{fD})$. If is the magnitude of the short-circuit current, $\theta_{fC}$ is the angle between the phase-C back EMF and its short-circuit current, and $\theta_{fD}$ is the angle between the phase-D back EMF and its short-circuit current. $\omega = \pi v/\tau$, $v$ is the electrical velocity of linear mover motor, and $\tau$ is the pole pitch.

The compensatory currents of phase-A, phase-B and phase-E are expressed as $$\begin{cases} i''_A = x_A \cos\theta + y_A \sin\theta \\ i''_B = x_B \cos\theta + y_B \sin\theta \\ i''_E = x_E \cos\theta + y_E \sin\theta \end{cases} \quad (16)$$

where $x_A$, $y_A$, $x_B$, $y_B$, $x_E$, $y_E$ are the amplitudes of the cosine and sine terms of healthy phase compensatory currents, respectively.

According to the principle that the sum of the compensatory currents of healthy phases is zero, which are used to restrain thrust fluctuations caused by fault-phase short-circuit currents, and the principle that the sum of MMFs of these currents and the short-circuit fault-phase currents is zero, the short-circuit compensatory currents ($i''_A$, $i''_B$, $i''_E$) in the healthy phases can be obtained. They can be expressed as $$\begin{cases} i''_A = 1.171(i_{sc\_C} + i_{sc\_D}) \\ i''_B = -0.895 i_{sc\_C} - 0.276 i_{sc\_D} \\ i''_E = -0.276 i_{sc\_C} - 0.895 i_{sc\_D} \end{cases} \quad (17)$$

The short-circuit compensatory currents ($i''_A$, $i''_B$, $i''_E$) in healthy phases are transformed to the short-circuit compensatory currents ($i''_\alpha$, $i''_\beta$) in the two-phase stationary frame by the generalized Clark transform matrix $T_{post}$, and they can be expressed as $$\begin{cases} i''_\alpha = 0.324(i_{sc\_C} + i_{sc\_D}) \\ i''_\beta = -0.236(i_{sc\_C} - i_{sc\_D}) \end{cases} \quad (18)$$

Part Three

The mathematical model under adjacent double-phase short-circuit faults is established.

Since the mutual inductance of the motor is much smaller than the phase inductance, it can be negligible. It is Assumed that the phase inductance is approximately constant, and the back EMFs only contain fundamental components. The vectorial angle of back EMF is determined by the position of each phase winding in space. Hence, the presented transformation matrix is unsuitable for the transformation of back EMFs. Hence, to realize the field-oriented control of the fault-tolerant PM linear motor with phase-C and phase-D short-circuit fault, the motor model under the short-circuit faults in the natural frame need to be rewritten as $$\begin{cases} u_{Ae} = u_A - e_A = Ri_A + L_s \dfrac{di_A}{dt} \\ u_{Be} = u_B - e_B = Ri_B + L_s \dfrac{di_B}{dt} \\ -e_C = Ri_C + L_s \dfrac{di_C}{dt} \\ -e_D = Ri_D + L_s \dfrac{di_D}{dt} \\ u_{Ee} = u_E - e_E = Ri_E + L_s \dfrac{di_E}{dt} \end{cases} \quad (19)$$

where $u_A$, $u_B$, $u_E$ are the phase voltages of the healthy phases, $e_A$, $e_B$, $e_C$, $e_D$, and $e_E$ are the back EMFs. $u_{Ae}$, $u_{Be}$, and $u_{Ee}$ are obtained by subtracting voltages ($e_A$, $e_B$, $e_E$) from the voltages ($u_A$, $u_B$, $u_E$). R is the phase resistance.

(5) The generalized Clark transform matrix $T_{post}$ is used to transform the remaining three healthy phase currents ($i_A$, $i_B$, $i_E$) sampled in the natural frame to the currents ($i'_\alpha$, $i'_\beta$) in the two-phase stationary frame. The currents are subtracted by the short-circuit compensatory currents ($i''_\alpha$, $i''_\beta$), then obtaining ($i_\alpha$, $i_\beta$). The Park transformation matrix $C_{2s/2r}$ is used to transform the currents ($i_\alpha$, $i_\beta$) to the feedback currents ($i_d$, $i_q$) in the synchronous rotating system. Alternatively, the currents ($i'_A$, $i'_B$, $i'_E$) can be obtained by subtracting the short-circuit compensatory currents ($i''_A$, $i''_B$, $i''_E$) in healthy phases, which are used to suppress thrust fluctuation caused by short-circuit fault-phase currents, from the remaining three healthy phase currents ($i_A$, $i_B$, $i_E$) sampled in the natural frame. The currents ($i'_A$, $i'_B$, $i'_E$) are transformed to the feedback currents ($i_d$, $i_q$) in the synchronous rotating frame by using the generalized Clark transform matrix $T_{post}$ and the Park transform matrix $C_{2s/2r}$.

(6) Mathematical model of the five-phase TVPM motor for electromagnetic suspension in the synchronous rotating frame is established under the two adjacent short-circuit phase faults.

The motor model with adjacent double-phase short-circuit faults in the natural frame (19) is transformed into the synchronous rotating frame. It can be expressed as $$\begin{cases} u_{de} = i_d R + L_s \dfrac{di_d}{dt} - \omega L_s i_q \\ u_{qe} = i_q R + L_s \dfrac{di_q}{dt} + \omega L_s i_d \end{cases} \quad (20)$$

According to the magnetic co-energy method, when the two adjacent short-circuit phase faults occur on the motor, the thrust force can be derived from equations (5)-(18)

$$F = \dfrac{\pi}{\tau}\left(\dfrac{1}{2} I_s^T \dfrac{\partial L_s}{\partial \theta} I_s + I_s^T \dfrac{\partial \Lambda_m}{\partial \theta}\right) = 2.5 \dfrac{\pi}{\tau} i_q \lambda_m \quad (21)$$

where $\lambda_m$ is PM flux.

Hence, as long as the $i_d$ and $i_q$ are controlled well in the synchronous rotating frame, the five-phase TVPM motor for electromagnetic suspension of the present invention can output desired thrust force under the adjacent double-phase short-circuit faults.

Part Four

The proposed FT-FOC strategy under adjacent double-phase short-circuit faults is proposed.

(7) A first-order inertia feed-forward voltage compensator is designed. Then, feed-forward compensatory voltages ($u_d^{comp}$, $u_q^{comp}$) are obtained by the current references ($i^*_d$, $i^*_q$) passing through the first-order inertia link $$\frac{\omega\alpha}{s+\alpha}$$

in the synchronous rotating frame. It can be expressed as $$\begin{cases} u_d^{comp} = \frac{\omega\alpha}{s+\alpha} i^*_q \\ u_q^{comp} = \frac{\omega\alpha}{s+\alpha} i^*_d \end{cases} \quad (22)$$

The difference between the current references ($i^*_d$, $i^*_q$) and the feedback currents ($i_d$, $i_q$) pass through the current internal mode controller $$\alpha L\left(1 + \frac{R}{sL}\right)$$

to obtain control voltages ($u_{d0}$, $u_{q0}$). Then, the control voltages are added with the feed-forward compensatory voltages ($u_d^{comp}$, $u_q^{comp}$). Thus, the voltage references ($u^*_d$, $u^*_q$) in the synchronous rotating frame can be expressed as $$\begin{cases} u^*_d = \alpha L\left(1 + \frac{R}{sL}\right)(i^*_d - i_d) - u_q^{comp} \\ u^*_q = \alpha L\left(1 + \frac{R}{sL}\right)(i^*_q - i_q) + u_d^{comp} \end{cases} \quad (23)$$

The voltage references ($u^*_d$, $u^*_q$) are transformed to the voltage references ($u^*_\alpha$, $u^*_\beta$) in two-phase stationary frame by using Park inverse transformation matrix $C_{2r/2s}$.

(8) The $T_{post}^T$, $C_{2r/2s}$ and the mover PM flux are employed to design back EMF observer, then the back EMFs in the healthy phases ($e_A$, $e_B$, $e_E$) can be obtained as:

$$\begin{bmatrix} e_A \\ e_B \\ e_E \end{bmatrix} = \omega\left(T_{post}^T C_{2r/2s}\begin{bmatrix} 0 \\ 2.5\lambda_m \end{bmatrix} - 0.539\lambda_m \sin\theta \begin{bmatrix} 1 \\ 1 \\ 1 \end{bmatrix}\right) \quad (24)$$

The back EMFs in the faulty phases ($e_C$, $e_D$) can be obtained according to the back EMFs in the healthy phases ($e_A$, $e_B$, $e_E$). Then, they can be expressed as $$\begin{cases} e_C = 2\cos\frac{2\pi}{5} e_B - e_A \\ e_D = 2\cos\frac{2\pi}{5} e_E - e_A \end{cases} \quad (25)$$

(9) According to the relationship between the short-circuit current in phase-C $i_C = i_{sc\_C}$ and its back EMF $e_C$, the relationship between the short-circuit current in phase-D $i_D = i_{sc\_D}$ and its back EMF of phase-D $e_D$, and the mathematical expression of the short-circuit compensatory currents, the short-circuit compensatory voltages ($u''_A$, $u''_B$, $u''_E$) in the remaining three healthy phases can be obtained as $$\begin{cases} u''_A = -1.171(e_C + e_D) \\ u''_B = 0.895 e_C + 0.276 e_D \\ u''_E = 0.267 e_C + 0.865 e_D \end{cases} \quad (26)$$

Equation (26) is transformed into the short-circuit compensatory voltages in the two-phase stationary frame by using the generalized Clark transform matrix $T_{post}^{-1}$, then it can be expressed as $$\begin{cases} u''_\alpha = -0.324(e_C + e_D) \\ u''_\beta = 0.236(e_C - e_D) \end{cases} \quad (27)$$

The voltage references ($u^*_\alpha$, $u^*_\beta$) in the two-phase stationary frame are added to the short-circuit compensatory voltages ($u''_\alpha$, $u''_\beta$), then they can be expressed as $$\begin{cases} u^{**}_\alpha = u^*_\alpha - 0.324(e_C + e_D) \\ u^{**}_\beta = u^*_\beta + 0.236(e_C - e_D) \end{cases} \quad (28)$$

(10) The generalized Clark inverse transformation matrix $T_{post}^{-1}$ is used to transform the voltage references ($u^{}_\alpha$, $u^{}_\beta$) to the voltage references ($u^*_A$, $u^*_B$, $u^*_E$) in the natural frame. And they are added with the back EMFs ($e_A$, $e_B$, $e_E$) in remaining healthy phases, Then, the expected phase voltage references ($u^{}_A$, $u^{}_B$, $u^{}_E$) can be obtained as $$\begin{bmatrix} u^{}_A \\ u^{}_B \\ u^{}_E \end{bmatrix} = T_{post}^{-1}\begin{bmatrix} u^{}_\alpha \\ u^{}_\beta \end{bmatrix} + \begin{bmatrix} e_A \\ e_B \\ e_E \end{bmatrix} \quad (29)$$

Alternatively, by using the generalized Clark inverse transformation matrix $T_{post}^{-1}$, the voltage references ($u^*_\alpha$, $u^*_\beta$) in the two-phase stationary frame are transformed to the voltage references ($u^*_A$, $u^*_B$, $u^*_E$) in the natural frame. Then, short-circuit compensatory voltages ($u''_A$, $u''_B$, $u''_E$) in the remaining three healthy phases are added to the voltage references ($u^*_A$, $u^*_B$, $u^*_E$). Finally, by adding the back EMFs ($e_A$, $e_B$, $e_E$) in remaining healthy phases again, the expected phase voltage references ($u^{}_A$, $u^{}_B$, $u^{**}_E$) can be calculated as:

$$\begin{bmatrix} u^{}_A \\ u^{}_B \\ u^{**}_E \end{bmatrix} = T_{post}^{-1}\begin{bmatrix} u^*_\alpha \\ u^*_\beta \end{bmatrix} + \begin{bmatrix} u''_A \\ u''_B \\ u''_E \end{bmatrix} + \begin{bmatrix} e_A \\ e_B \\ e_E \end{bmatrix} \quad (30)$$

(11) The expected phase voltage references ($u^{}_A$, $u^{}_B$, $u^{**}_E$) obtained in step (10) are passed through the voltage source inverter. Then CPWM modulation method is used to realize the FT-FOC disturbance-free operation of the five-phase TVPM motor for electromagnetic suspension under the adjacent double-phase short-circuit fault condition.

Figure 7:
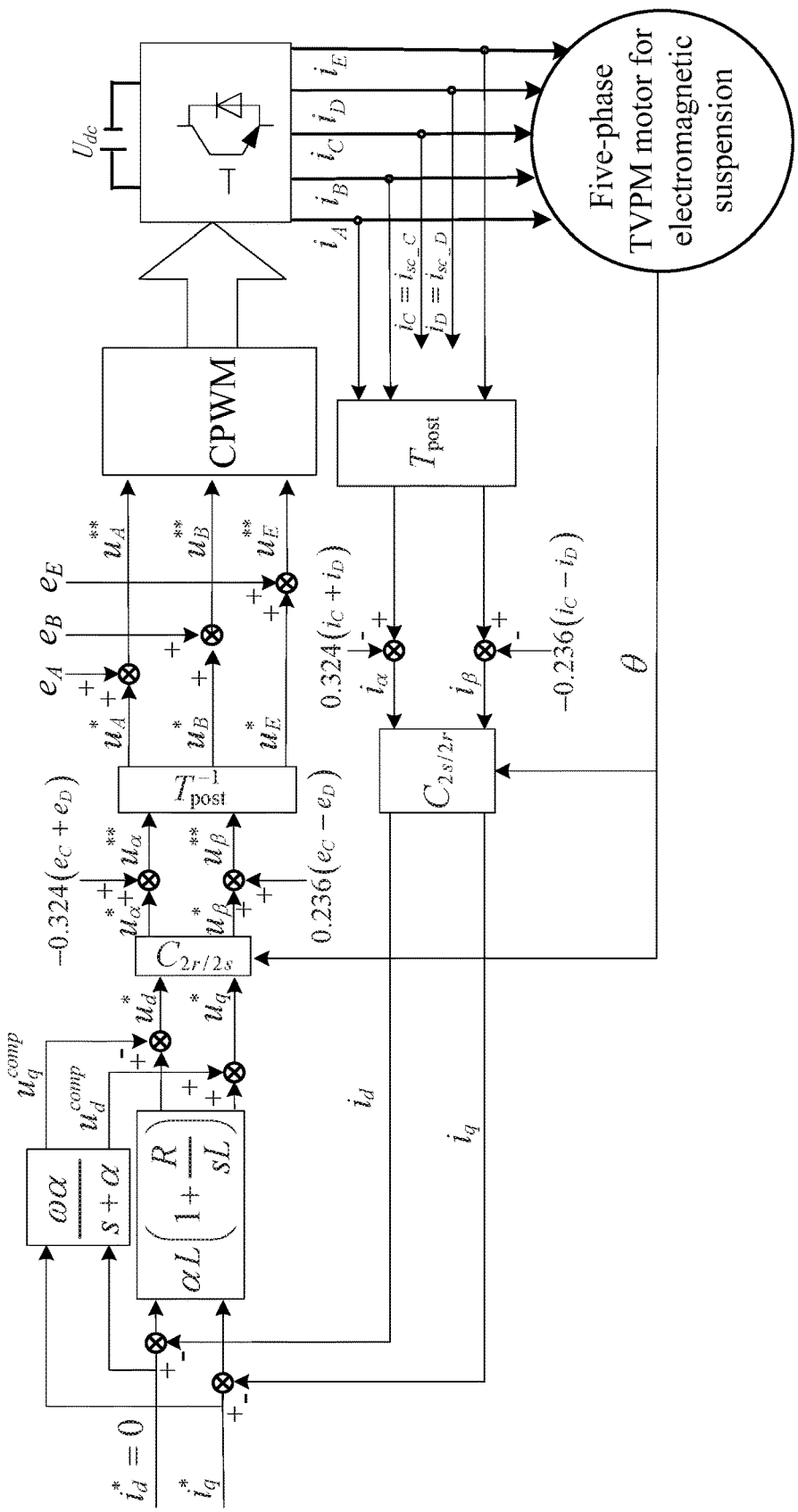
FIG. 7 shows the block diagram of FT-FOC of five-phase TVPM motor for electromagnetic suspension under the phase-C and phase-D short-circuit faults of the invention as case 1.
Figure 8:
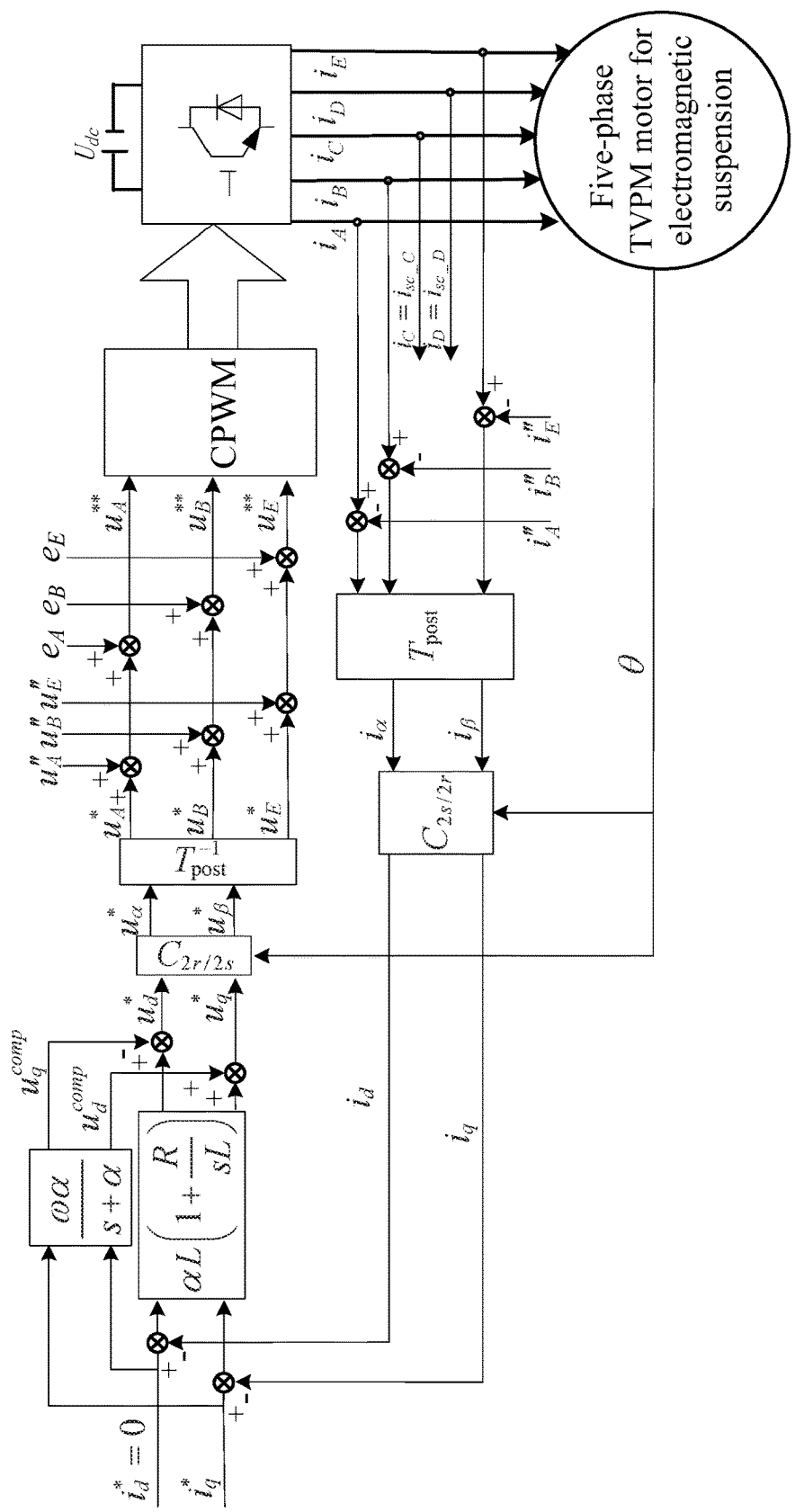
FIG. 8 shows the block diagram of FT-FOC of five-phase TVPM motor for electromagnetic suspension under the phase-C and phase-D short-circuit faults of the invention as case 2.

The expected phase voltages in equation (29) or (30) are fed into the voltage source inverter with CPWM modulation based on zero-sequence voltage harmonic injection, thus disturbance-free fault-tolerant operation of five-phase TVPM motor for electromagnetic suspension can be realized under phase-C and phase-D short-circuit faults. The high-performance FT-FOC strategy under adjacent double-phase short-circuit faults of the present invention is shown in FIGS. 7 and 8.

When the open-circuit faults occur on phase-C and phase-D, it is simple to set the short-circuit compensatory currents in step (4) to zero, and to set the short-circuit compensatory voltages in step (9) to zero. Then, the five-phase TVPM motor for electromagnetic suspension can run well under the adjacent double-phase open-circuit faults by using the proposed FT-FOC method.

When the open-circuit fault occurs on phase-C and the short-circuit fault occurs to phase-D, it is necessary to make the short-circuit compensatory current $i_{sc\_C}=0$ in step (4) and the short-circuit compensatory voltage $e_C=0$ in step (9). Then, five-phase TVPM motor for electromagnetic suspension can run well under phase-C open-circuit fault and phase-D short-circuit fault by using the proposed FT-FOC method.

When the phase-C short-circuit fault and the phase-D open-circuit fault occur, it is only necessary to make the short-circuited compensatory current $i_{sc\_D}=0$ in step (4) and the short-circuited compensatory voltage $e_D=0$ in step (9). The five-phase TVPM motor for electromagnetic suspension can operate well under phase-C short-circuit fault and phase-D open-circuit fault by using the proposed FT-FOC method.

When another two adjacent phase faults occur, it is only necessary to rotate the natural frame in counterclockwise (k=0, 1, 2, 3, 4. When phase-C and phase-D faults occur, k=0; phase-D and phase-E faults occur, k=1; phase-E and phase-A faults occur, k=2; phase-A and phase-B faults occur, k=3; phase-B and phase-C faults occur, k=4) by $$\frac{2\pi}{5}k$$

electrical angle. The Park transformation matrix and its inverse transformation matrix are expressed as $$C_{2s/2r} = \begin{bmatrix} \cos(\theta - 2k\pi/5) & \sin(\theta - 2k\pi/5) \\ -\sin(\theta - 2k\pi/5) & \cos(\theta - 2\pi k/5) \end{bmatrix} \quad (31)$$

$$C_{2r/2s} = \begin{bmatrix} \cos\left(\omega t - \frac{2k\pi}{5}\right) & -\sin\left(\omega t - \frac{2k\pi}{5}\right) \\ \sin\left(\omega t - \frac{2k\pi}{5}\right) & \cos\left(\omega t - \frac{2k\pi}{5}\right) \end{bmatrix} \quad (32)$$

According to FIGS. 6-8, the control system simulated model of the five-phase TVPM motor for electromagnetic suspension shown in FIG. 2 is established in Matlab/Simulink. The simulation is carried out and the simulated results of the five-phase TVPM motor for electromagnetic suspension under two adjacent short-circuit phase faults are obtained.

Figure 9:
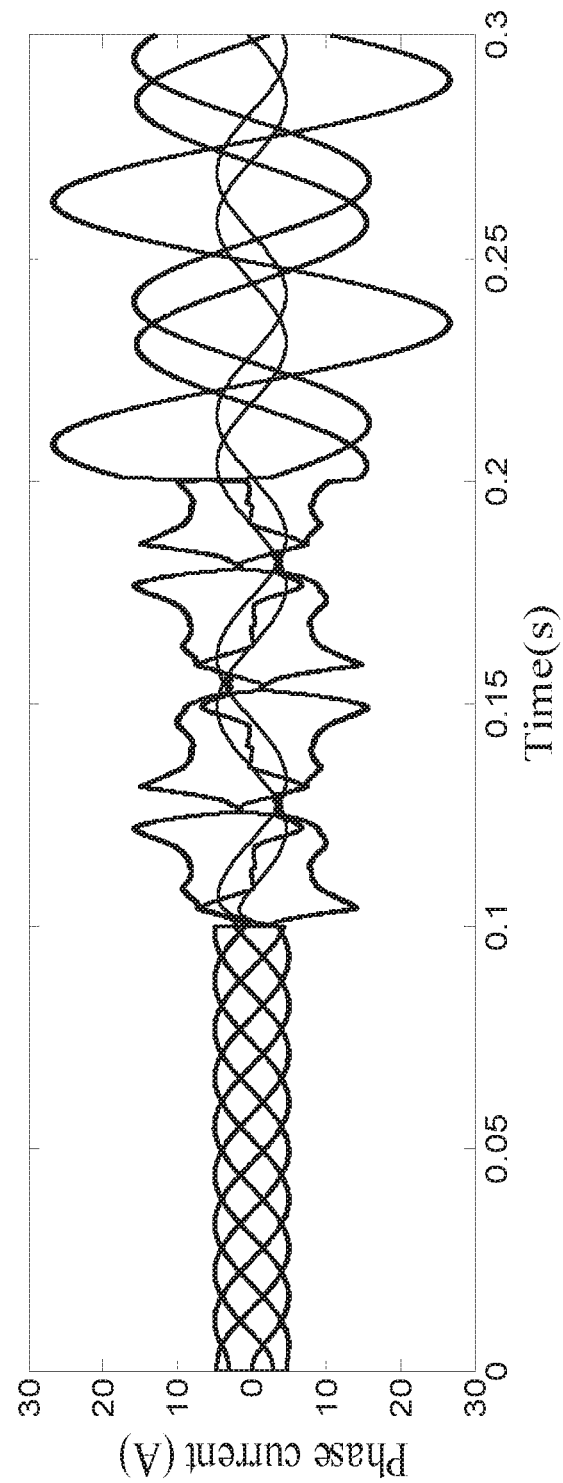
FIG. 9 shows the phase current waveforms of no-fault-tolerant and FT_FOC operation under phase-C and phase-D short-circuit faults of the invention.
Figure 10:
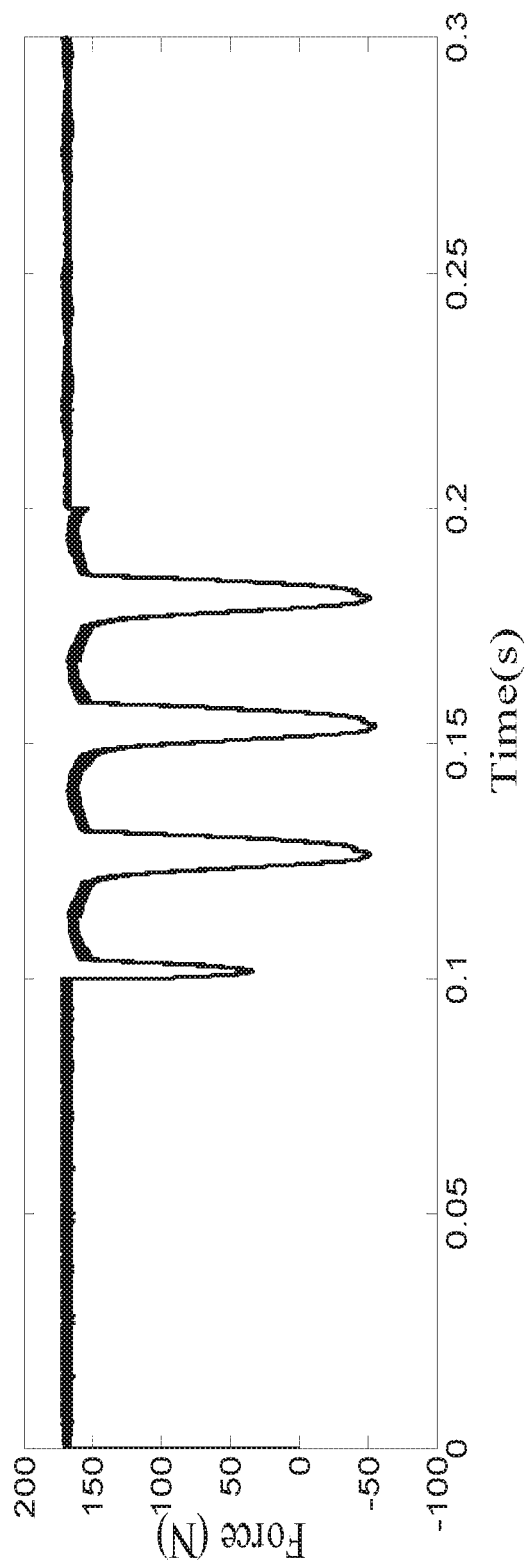
FIG. 10 shows the thrust force waveform of no-fault-tolerant and FT-FOC operation under phase-C and phase-D short-circuit faults of the invention.
Figure 11:
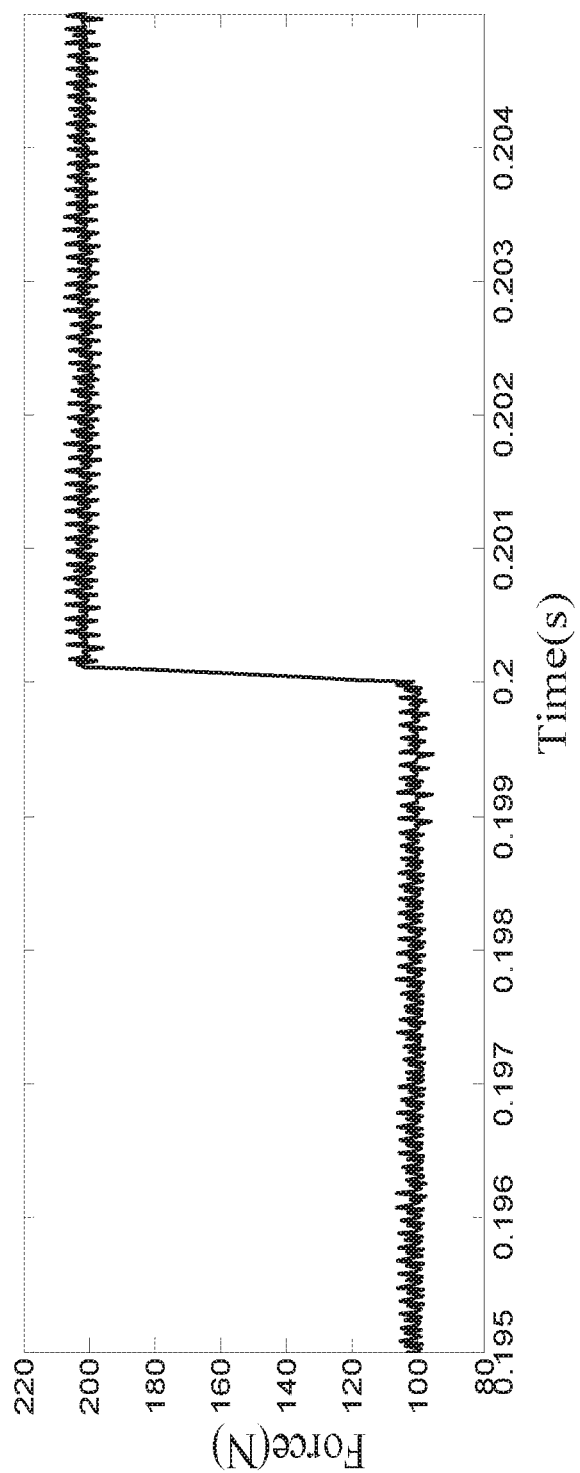
FIG. 11 shows the output thrust force waveform of healthy operation when the thrust force reference steps of the invention.
Figure 12:
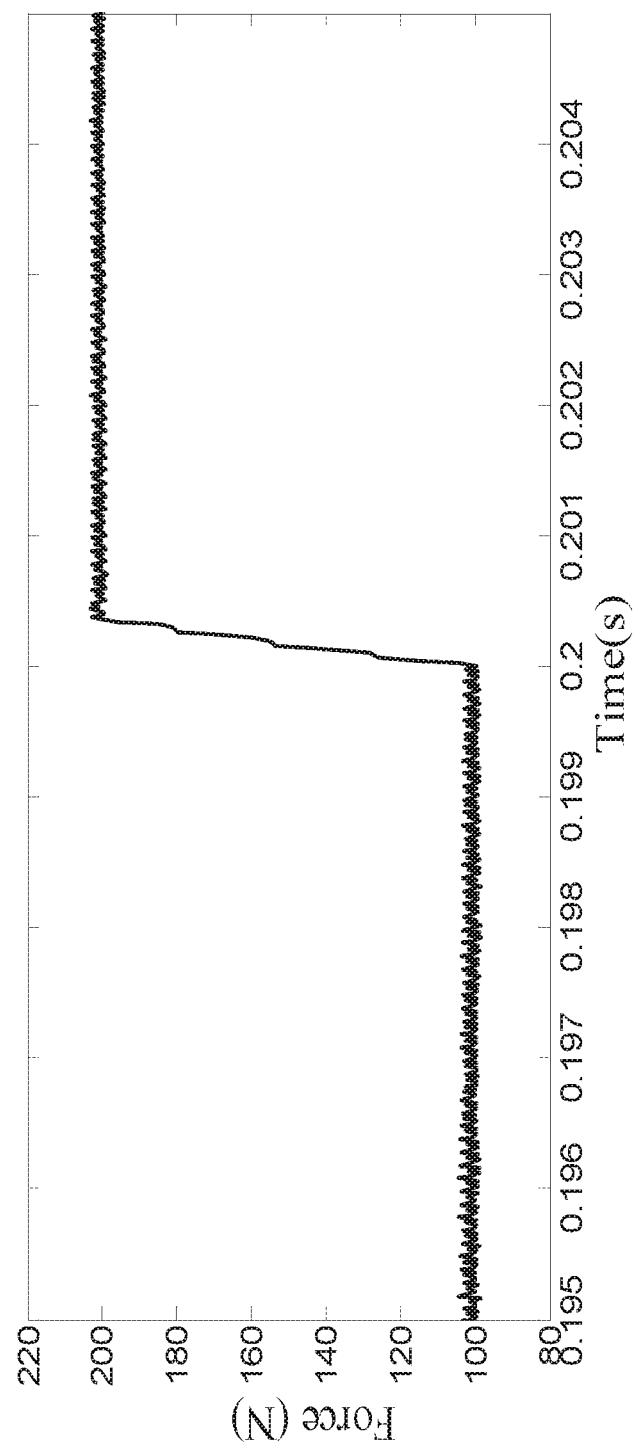
FIG. 12 shows the output thrust force waveform of fault-tolerant operation when the thrust force reference steps of the invention.

FIG. 9 is the phase current waveforms under phase-C and phase-D short-circuit faults. The short-circuit faults occur at 0.1s, and the current waveforms are distorted. However, when the FT-FOC strategy of the present invention is activated at 0.2s, the sinusoidal currents are obtained. FIG. 10 is the thrust waveform under phase-C and phase-D short-circuit faults. Short-circuit faults also occur at 0.1s, and the output thrust force fluctuations are significantly high. However, when short-circuit FT-FOC strategy of the present invention is employed at 0.2s, the output thrust force pulsation is significantly suppressed, and there is almost no pulsation. FIG. 11 shows the output thrust force response when the thrust force reference steps during healthy operation, and the thrust force response time is 0.2 ms. FIG. 12 shows the output thrust force response with the proposed short-circuit FT-FOC strategy when the thrust force reference steps under the phase-C and phase-D short-circuit faults, and the thrust response time is also 0.2 ms. Hence, the proposed FT-FOC strategy enables the five-phase TVPM motor for electromagnetic suspension motor with two adjacent short-circuit phase faults to possess the same dynamic performance and steady-state performance as that under healthy condition. In addition, the current tracking performance is good, and the undisturbed fault-tolerant operation is realized.

It can be concluded that when the adjacent double-phase faults (open-circuit, short-circuit or one phase open-circuit and another phase short-circuit) occur, the five-phase TVPM motor for electromagnetic suspension under the maximum currents can not only output the same thrust force as that under healthy condition, but also smooth the thrust fluctuation obviously. Especially, its dynamic and steady-state performance, and current tracking accuracy are similar to those in healthy operation, and it is suitable for any two adjacent phase faults (open-circuit, short-circuit or one phase open-circuit and another phase short-circuit). It has advantages such as high versatility, uncomplicated calculation, low CPU overhead, simple setting parameters of current regulator. Hence, the present invention has a good application prospect in electromagnetic active suspension system with high operational reliability requirements.

Although the present invention has been made public as above implement example, the example is not used to limit the invention. Any equivalent change or retouching within the spirit and field of the present invention belongs to the protective range of the invention.

What is claimed is:

1. A five-phase tubular vernier permanent-magnet (TVPM) motor for electromagnetic suspension comprises an inner stator, an outer stator, and a long mover between the inner stator and the outer stator,
   wherein a length of the inner stator and the outer stator is equal and is smaller than a length of the long mover, the inner stator and the outer stator are integrally connected by an E-type non-magnetic material tube which is directly fixed to the carriage, while the suspension spring is installed between the long mover and the E-type non-magnetic material tube, an other side of the long mover is directly connected to a chassis or a tire, the middle opening direction of E-shaped non-magnetic material tube is the moving direction of the long mover,
   wherein an air gap $g_1$ is located between the outer stator and the long mover, an air gap $g_2$ is located between the inner stator and the long mover, the air gap $g_1$ and $g_2$ should satisfy: $g_1 > g_2$, and $g_1$ and $g_2$ are greater than zero, wherein the inner stator and outer stator are adopted different structures, wherein permanent magnets (PMs) are surface-mounted or embedded in the inner stator, and armature coil windings are placed in the outer stator,
   wherein the long mover is composed of $n_c$ pieces of flux-modulated rings which are uniformly arranged along an axial direction of the motor, wherein pieces of flux-modulated rings and the inner stator armatures are composed of permeability magnetic material, the non-magnetic material is placed between an adjacent double-piece of flux-modulated rings, the number $n_c$ of the flux-modulated rings, the pole pairs $n_p$ of the PMs and the pole pairs $n_w$ of the coil windings satisfy the following relationship: $n_c=n_p+n_w$, wherein a vernier modulation effect is achieved.

2. The TVPM motor for electromagnetic suspension of claim 1, wherein the outer stator comprises an outer stator armature iron core, coil windings, and armature teeth and fault-tolerant teeth (FTT), wherein the outer stator armature iron core is made of permeability magnetic materials, wherein the number of the armature teeth is equal to that of FTT, wherein the FTT interleaving the armature teeth are employed, wherein the FTT is placed between the adjacent double armature teeth, wherein a radial thickness of the FTT is equal to a sum of a radial thickness of the pole shoe and the armature tooth, while the axial thickness of the armature tooth is greater than that of the FTT and less than that of the pole shoe, wherein the coil windings are divided to m phases, and m is a positive integer which is no less than 1, wherein each phase windings are composed of two sets of coil windings, and fractional-slot concentrated-windings and phase separation mode are adopted, only one coil winding is placed in each armature slots, the number of armature teeth is 2m, and the number of FTT is 2m.

3. The TVPM motor for electromagnetic suspension of claim 1, wherein the PMs in the inner stator can be adopted with radial consequent pole excitation mode, radial alternating excitation mode, axial alternating excitation mode, or arrays excitation mode,
   wherein when the PMs are adopted with radial consequent pole excitation mode or radial alternating excitation mode, the PMs are axially segmented to reduce eddy-current loss in the PMs,
   wherein when the PMs are in an arrays form to enhance flux-concentrating effect, each pair of PMs has two PM arrays, which is composed of several odd-numbered PMs, wherein the middle PM is alternately excited in the radial direction, while the magnetic directions of the PMs on both sides are pointed into the middle radial excited PM in the axial direction, wherein the number of pole pairs of PMs in inner stator is $n_p$.

4. The TVPM motor for electromagnetic suspension of claim 1, wherein the motor is configured for a tubular motor with $2*n_p/n_s$ pole-slot ratio, wherein the motor is configured to adjust a number of flux-modulated rings to satisfy a modulation ratio according to a different pole-slot radio, wherein a modulation effect is achieved.

5. A fault-tolerant field-oriented control (FT-FOC) method of controlling a TVPM motor for electromagnetic suspension under adjacent double-phase short-circuit faults, the motor comprising five phases, including phase-A, phase-B, phase-C, phase-D, and phase-E, wherein the FT-FOC method under adjacent double-phase short-circuit faults comprises the following steps:
   (1) providing a five-phase TVPM motor for electromagnetic suspension model;
   (2) providing a TVPM motor for electromagnetic suspension having five stages, including phase-A, phase-B, phase-C, phase-D, and phase-E, wherein when short-circuit faults occur on phase-C and phase-D, it is assumed that only the open-circuit faults occur on the phase-C and phase-D, wherein according to a principle that the traveling wave magneto-motive forces (MMFs) is invariant before and after the faults, the constraint that the sum of the currents in remaining healthy phases is zero, and the constraint that the amplitudes of the currents in phase-B and phase-E are equal, the fault-tolerant currents in the remaining healthy phases of the motor with phase-C and phase-D open-circuit faults are achieved, which can be expressed as $$\begin{cases} i_A = 3.618(-i_q^* \sin(\theta) + i_d^* \cos(\theta)) \\ i_B = 2.236\left(-i_q^* \sin\left(\theta - \frac{4}{5}\pi\right) + i_d^* \cos\left(\theta - \frac{4}{5}\pi\right)\right) \\ i_E = 2.236\left(-i_q^* \sin\left(\theta + \frac{4}{5}\pi\right) + i_d^* \cos\left(\theta + \frac{4}{5}\pi\right)\right) \end{cases}$$

where $i^*_d$ and $i^*_q$ are the current references of the d-axis and the q-axis in the synchronous rotating frame, and $$\theta = \int \frac{\pi v}{\tau} dt$$

is the electrical angle, $v$ is electrical velocity of linear motor mover, and $\tau$ is the pole pitch;
   (3) according to the fault-tolerant currents in the remaining healthy phases, the generalized Clark transformation matrix $T_{post}$ of two rows and three columns used to transform a three-phase natural frame to a two-phase stationary frame, the inverse transform matrix $T_{post}^{-1}$ with three rows and two columns and the transposed matrix $T_{post}^T$ can be obtained $$T_{post} = \begin{bmatrix} \frac{1.618 \cos 0}{8.781} & \frac{\cos\frac{4\pi}{5}}{8.781} & \frac{\cos\left(-\frac{4\pi}{5}\right)}{8.781} \\ 0 & \frac{\sin\frac{4\pi}{5}}{1.545} & \frac{\sin\left(-\frac{4\pi}{5}\right)}{1.545} \end{bmatrix}$$

$$T_{post}^{-1} = 2.236 \begin{bmatrix} 1.618 \cos 0 & 0 \\ \cos\frac{4\pi}{5} & \sin\frac{4\pi}{5} \\ \cos\left(-\frac{4\pi}{5}\right) & \sin\left(-\frac{4\pi}{5}\right) \end{bmatrix}$$

$$T_{post}^T = \begin{bmatrix} \frac{1.618 \cos 0}{8.781} & 0 \\ \frac{\cos\frac{4\pi}{5}}{8.781} & \frac{\sin\frac{4\pi}{5}}{1.545} \\ \frac{\cos\left(-\frac{4\pi}{5}\right)}{8.781} & \frac{\sin\left(-\frac{4\pi}{5}\right)}{1.545} \end{bmatrix};$$

(4) healthy phase currents are used to suppress the thrust force fluctuations caused by the fault-phase short-circuit currents, then the short-circuited compensatory currents ($i''_A$, $i''_B$, $i''_E$) are obtained, which are used to suppressed the thrust force fluctuations caused by the short-circuit currents, wherein the short-circuited compensatory currents ($i''_A$, $i''_B$, $i''_E$) are transformed to the short-circuited compensatory currents ($i''_\alpha$, $i''_\beta$) in the two-phase stationary frame by the generalized Clark transform matrix $T_{post}$;

(5) a generalized Clark transform matrix $T_{post}$ is used to transform the remaining healthy phase currents ($i_A$, $i_B$, $i_E$) sampled in the natural frame to the currents ($i'_\alpha$, $i'_\beta$) in the two-phase stationary frame, and the feedback currents ($i_\alpha$, $i_\beta$) can be obtained by subtracting the short-circuited compensatory currents ($i''_\alpha$,$i''_\beta$) worked out in step (4) from the currents ($i'_\alpha$, $i'_\beta$), wherein the Park transformation matrix $C_{2s/2r}$ is used to transform the feedback currents ($i_\alpha$, $i_\beta$) to the feedback currents ($i_d$, $i_q$) in the synchronous rotating frame;

(5') the currents ($i'_A$, $i'_B$, $i'_E$) can be obtained by subtracting the short-circuited compensatory currents ($i''_A$,$i''_B$,$i''_E$) of the healthy phases from the remaining healthy phase currents ($i_A$,$i_B$,$i_E$) sampled in the natural frame, then, the generalized Clark transform matrix $T_{post}$ and the Park transform matrix $C_{2s/2r}$ are used to transform ($i'_A$,$i'_B$,$i'_E$) to the feedback currents ($i_d$, $i_q$) in the synchronous rotating frame;

(6) a mathematical model of the five-phase TVPM motor for electromagnetic suspension in the synchronous rotating frame is established under the two adjacent short-circuit phase faults;

(7) a first-order inertia feed-forward voltage compensator is designed, then the feed-forward compensation voltages ($u_d^{comp}$,$u_q^{comp}$) are obtained by the current references ($i^*_d$,$i^*_q$) feeding into a first-order inertia link $$\frac{\omega\alpha}{s+\alpha}$$

in the synchronous rotating frame, wherein when the difference between the current references ($i^*_d$, $i^*_q$) and the feedback currents ($i_d$, $i_q$) are fed into the current internal mode controller $$\alpha L\left(1+\frac{R}{sL}\right),$$

then the control voltages ($u_{d0}$,$u_{q0}$) are obtained, wherein the voltages ($u_{d0}$,$u_{q0}$) are added to the feed-forward compensatory voltage ($u_d^{comp}$,$u_q^{comp}$), wherein the voltage references ($u^*_d$,$u^*_q$) are obtained in the synchronous rotating frame, then, the Park inverse transformation matrix $C_{2r/2s}$ is used to transform them to the voltage references ($u^*_\alpha$,$u^*_\beta$) in the two-phase stationary frame;

(8) the $T_{post}^T$, $C_{2r/2s}$ and the mover PM flux are employed to design back EMFs observer, then back EMFs ($e_A$, $e_B$,$e_E$) in the healthy phases can be observed $$\begin{bmatrix} e_A \\ e_B \\ e_E \end{bmatrix} = \omega\left(T_{post}^T C_{2r/2s}\begin{bmatrix} 0 \\ 2.5\lambda_m \end{bmatrix} - 0.539\lambda_m \sin\theta \begin{bmatrix} 1 \\ 1 \\ 1 \end{bmatrix}\right),$$

where the back EMFs ($e_C$, $e_D$) in the fault phases can be obtained according to the back EMFs ($e_A$,$e_B$,$e_E$) in the healthy phases $$\begin{cases} e_C = 2\cos\frac{2\pi}{5}e_B - e_A \\ e_D = 2\cos\frac{2\pi}{5}e_E - e_A \end{cases};$$

(9) to ensure that the remaining healthy phases of the motor generate the short-circuited compensatory currents ($i''_A$,$i''_B$,$i''_E$), which are used to suppress the thrust fluctuations caused by the short-circuit currents, the short-circuited compensatory voltages ($u''_A$,$u''_B$,$u''_E$) in the remaining healthy phases are derived as $$\begin{cases} u''_A = -1.171(e_C + e_D) \\ u''_B = 0.895e_C + 0.276e_D \\ u''_E = 0.276e_C + 0.895e_D \end{cases}$$

according to the relationship between the short-circuit current $i_C = i_{sc\_C}$ in phase-C and its back EMF $e_C$, the relationship between the short-circuit current $i_D = i_{sc\_D}$ in phase-D and its back EMF $e_D$, and the mathematical expression of the short-circuited compensatory currents, wherein the generalized Clark transform matrix $T_{post}^{-1}$ is used to transform the short-circuited compensatory voltages ($u''_A$,$u''_B$,$u''_E$) to the short-circuited compensatory voltages $$\begin{cases} u''_\alpha = -0.324(e_C + e_D) \\ u''_\beta = 0.236(e_C - e_D) \end{cases}$$

in the two-phase stationary frame;

(10) the voltage references ($u^*_\alpha$,$u^*_\beta$) in the two-phase stationary frame are added to the short-circuited compensatory voltages ($u''_\alpha$,$u''_\beta$), then, they can be expressed as $$\begin{cases} u^{**}_\alpha = u^*_\alpha - 0.324(e_C + e_D) \\ u^{**}_\beta = u^*_\beta + 0.236(e_C - e_D) \end{cases},$$

the Clark inverse transformation matrix $T_{post}^{-1}$ is used to transform the voltages ($u^{}_\alpha$,$u^{}_\beta$) to the voltage references ($u^*_A$,$u^*_B$,$u^*_E$) in the natural frame, and, the expected phase voltage references ($u^{}_A$,$u^{}_B$,$u^{**}_E$) in the remaining healthy phases can be obtained by adding the back EMFs ($e_A$,$e_B$,$e_E$) in the remaining healthy phases to the voltage references ($u^*_A$,$u^*_B$,$u^*_E$) in the remaining healthy phases;

(10') the generalized Clark inverse transformation matrix $T_{post}^{-1}$ is used to transform the voltage references ($u^*_\alpha$,$u^*_\beta$) in the two-phase stationary frame to the voltage references ($u^*_A$,$u^*_B$,$u^*_E$) in the natural frame, then the expected phase voltage references ($u^{}_A$,$u^{}_B$, $u^{**}_E$) are obtained by adding the short-circuited compensatory voltages ($u''_A$,$u''_B$,$u''_E$) and the back EMFs ($e_A$,$e_B$,$e_E$) to voltage references ($u^*_A$, $u^*_B$,$u^*_E$) in the remaining three-phase healthy phases; and

(11) fault-tolerant disturbance-free operation of the five-phase TVPM motor for electromagnetic suspension under adjacent double-phase short-circuit fault condition is realized by feeding the expected phase voltage references ($u^{}_A$,$u^{}_B$,$u^{**}_E$) obtained in (10) into the voltage source inverter with the CPWM modulation method.

6. The FT-FOC method of controlling a TVPM motor for electromagnetic suspension under adjacent double-phase short-circuit faults of claim 5, further comprising:
when the open-circuit faults occur in phase-C and phase-D, the short circuit compensatory currents in step (4) is set to zero, and the short-circuited compensatory voltages in step (9) is set to zero, wherein the five-phase TVPM motor for electromagnetic suspension can operate under adjacent double-phase open-circuit faults using the FT-FOC method, when the open-circuit fault occurs in phase-C and the short-circuit fault occurs in phase-D, the short-circuited compensatory current is $i_{sc\_C}=0$ in step (4) and the short-circuited compensation voltage is $e_C=0$ in step (9), then, wherein the fault-tolerant operation of five-phase TVPM motor for electromagnetic suspension under phase-C open-circuit fault and phase-D short-circuit fault is realized, when phase-C short-circuit fault and phase-D open-circuit fault occur, the short-circuited compensatory current is $i_{sc\_D}=0$ in step (4) and the short-circuited compensatory voltage is $e_D=0$ in step (9), then, wherein the fault-tolerant operation of five-phase TVPM motor for electromagnetic suspension motor under phase-C short-circuit fault and phase-D open-circuit fault is realized.

7. The FT-FOC method of controlling a TVPM motor for electromagnetic suspension under adjacent double-phase short-circuit faults of claim 5, wherein step (4) comprises the following steps:

(4.1) when the short-circuit current in phase-C is $i_{sc\_C}=I_f \cos(\omega t - \theta_{fC})$, the short-circuit current in phase-D is $i_{sc\_D}=I_f \cos(\omega t - \theta_{fD})$, where $I_f$ is the amplitude of the short-circuit current, and $\theta_{fC}$ is the angle between the phase-C back EMF and its short-circuit current, and $\theta_{fD}$ is the angle between the phase-D back EMF and its short-circuit current. $\omega=\pi v/\tau$, $v$ is the electrical velocity of linear motor mover, and $\tau$ is the pole pitch, (4.2) wherein, according to the principle that the sum of the compensatory currents used to restrain the thrust fluctuations caused by the short-circuit currents, the principle that sum of MMFs of the short-circuited compensatory currents and the short-circuit fault-phase currents is zero, the short-circuited compensatory currents ($i''_A, i''_B, i''_E$) in the remaining healthy phases are obtained, which can be expressed as:

$$\begin{cases} i''_A = 1.171(i_{sc\_C} + i_{sc\_D}) \\ i''_B = -0.865 i_{sc\_C} - 0.276 i_{sc\_D} \\ i''_E = -0.276 i_{sc\_C} - 0.895 i_{sc\_D} \end{cases}$$

(4.3) wherein the compensatory currents ($i''_A, i''_B, i''_E$) in the remaining healthy phases are transformed to the short-circuited compensatory currents ($i''_\alpha, i''_\beta$) in the two-phase stationary frame by using the generalized Clark transform matrix $T_{post}$, then they can be expressed as $$\begin{cases} i''_\alpha = 0.324(i_{sc\_C} + i_{sc\_D}) \\ i''_\beta = -0.236(i_{sc\_C} - i_{sc\_D}) \end{cases}.$$

8. The FT-FOC method of controlling a TVPM motor for electromagnetic suspension under adjacent double-phase short-circuit faults of claim 5, wherein step (6) comprises the following steps:

(6.1) when inductance is a constant $L_s$, when the phase voltages are subtracted by the back EMFs, the model of the motor with phase-C and phase-D short-circuit faults in the natural frame are expressed as $$\begin{cases} u_{Ae} = u_A - e_A = R i_A + L_s \dfrac{di_A}{dt} \\ u_{Be} = u_B - e_B = R i_B + L_s \dfrac{di_B}{dt} \\ -e_C = R i_C + L_s \dfrac{di_C}{dt} \\ -e_D = R i_D + L_s \dfrac{di_D}{dt} \\ u_{Ee} = u_E - e_E = R i_E + L_s \dfrac{di_E}{dt} \end{cases}$$

where $u_A$, $u_B$, and $u_E$ are the phase voltages of the healthy phases. $e_A$, $e_B$, $e_C$, $e_D$ and $e_E$ are the back EMFs. $u_{Ae}$, $u_{Be}$ and $u_{Ee}$ are obtained by subtracting the back EMFs ($e_A$, $e_B$, $e_E$) from the voltages ($u_A$, $u_B$, $u_E$) of the healthy phases, where R is the phase resistance, (6.2) wherein the currents in healthy phases are processed according to step (5), then, the generalized Clark transformation matrix $T_{post}$ and the Park transformation $C_{2s/2r}$ are used to transform the model of the motor with adjacent double-phase short-circuit faults in the natural frame into the synchronous rotating frame, then it can be expressed as $$\begin{cases} u_{de} = i_d R + L_s \dfrac{di_d}{dt} - \omega L_s i_q \\ u_{qe} = i_q R + L_s \dfrac{di_q}{dt} + \omega L_s i_d \end{cases},$$

(6.3) wherein when the adjacent double-phase short-circuit faults occur on motor, by using the magnetic co-energy method, the thrust force is derived based on the transformation matrices $T_{post}$, $T_{post}^{-1}$, $C_{2s/2r}$ and $C_{2r/2s}$ $$F = 2.5 \dfrac{\pi}{\tau} i_q \lambda_m$$

where $\lambda_m$ is PM flux.

9. The FT-FOC method of controlling a TVPM motor for electromagnetic suspension under adjacent double-phase short-circuit faults of claim 5, wherein the described FT-FOC method is applicable to a five-phase fault-tolerant PM rotating machine with adjacent double-phase faults.

* * * * *